US011321869B2

(12) United States Patent
Chiussi et al.

(10) Patent No.: US 11,321,869 B2
(45) Date of Patent: *May 3, 2022

(54) ACCURATE POSITIONING SYSTEM USING ATTRIBUTES

(71) Applicant: GADGET SOFTWARE, INC., Newark, NJ (US)

(72) Inventors: Fabio M. Chiussi, Long Branch, NJ (US); Parameshwar Hegde, Westford, MA (US)

(73) Assignee: GADGET SOFTWARE, INC., Hackensack, NJ (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/872,260

(22) Filed: May 11, 2020

(65) Prior Publication Data

US 2020/0273204 A1    Aug. 27, 2020

Related U.S. Application Data

(63) Continuation of application No. 14/707,638, filed on May 8, 2015, now Pat. No. 10,650,549, which is a continuation of application No. 13/965,136, filed on Aug. 12, 2013, now Pat. No. 9,036,867.

(51) Int. Cl.
*G06T 7/73* (2017.01)

(52) U.S. Cl.
CPC ...... *G06T 7/74* (2017.01); *G06T 2207/10004* (2013.01)

(58) Field of Classification Search
None
See application file for complete search history.

(56) References Cited

U.S. PATENT DOCUMENTS

| 7,995,117 B1 * | 8/2011 | Bonn | H04N 5/77 |
| | | | 348/231.3 |
| 8,280,107 B2 * | 10/2012 | Kmiecik | G06K 9/00818 |
| | | | 382/103 |

(Continued)

FOREIGN PATENT DOCUMENTS

KR     20050013445 A     2/2005

OTHER PUBLICATIONS

Any information that are not included with this Information Disclosure Statement can be found in U.S. Appl. No. 14/707,638.

*Primary Examiner* — Anand P Bhatnagar
(74) *Attorney, Agent, or Firm* — Miles & Stockbridge P.C.; David R. Schaffer

(57) ABSTRACT

A Position Identification Solution offers a way to determine the position of a Mobile Device by defining a set of known positions and an associated set of objects, shapes, or attributes. A Mobile Device determines its position by scanning an object, shape, or attribute using an included camera, and a Mobile Application running on the Mobile Device recognizes a specific object, shape, or attribute, and determines a corresponding position, which is used to compute the position of the Mobile Device. The Position Identification Solution may use shapes, colors, or combinations of shape and colors. The Position Identification Solution may be used together with other positioning systems in a Hybrid Positioning System to compute the position of the Mobile Device with increased accuracy.

20 Claims, 14 Drawing Sheets

(56) References Cited

U.S. PATENT DOCUMENTS

| | | | |
|---|---|---|---|
| 8,406,531 B2* | 3/2013 | Ramanujapuram | G06F 16/51 |
| | | | 382/209 |
| 8,983,184 B2 | 3/2015 | Woo | |
| 9,244,943 B2* | 1/2016 | Boncyk | G06Q 30/0217 |
| 9,324,003 B2* | 4/2016 | France | G06K 9/00664 |
| 9,342,748 B2* | 5/2016 | Boncyk | A61F 9/08 |
| 9,342,927 B2* | 5/2016 | Adhikari | G09G 5/00 |
| 9,400,941 B2* | 7/2016 | Kurz | G06K 9/46 |
| 9,418,279 B2* | 8/2016 | Krishnamoorthi | G06T 7/0016 |
| 9,449,023 B2* | 9/2016 | Ol | H04W 4/029 |
| 9,536,168 B2* | 1/2017 | Boncyck | G06F 16/583 |
| 2008/0230702 A1* | 9/2008 | Rousso | A61B 5/4076 |
| | | | 250/363.02 |
| 2009/0169052 A1* | 7/2009 | Seki | G06T 7/74 |
| | | | 382/103 |
| 2009/0228204 A1* | 9/2009 | Zavoli | G01S 19/49 |
| | | | 701/532 |
| 2009/0285492 A1* | 11/2009 | Ramanujapuram | |
| | | | G06F 16/5846 |
| | | | 382/209 |
| 2010/0156813 A1 | 6/2010 | Duarte et al. | |
| 2010/0166256 A1* | 7/2010 | Kmiecik | G06T 7/593 |
| | | | 382/103 |
| 2010/0250136 A1 | 9/2010 | Chen | |
| 2010/0270426 A1* | 10/2010 | Saito | B64C 13/24 |
| | | | 244/99.7 |
| 2010/0272426 A1 | 10/2010 | Huliyapur Math | |
| 2010/0303354 A1* | 12/2010 | Reznik | G06K 9/4642 |
| | | | 382/168 |
| 2011/0085697 A1* | 4/2011 | Clippard | G06K 9/6212 |
| | | | 382/100 |
| 2013/0100319 A1* | 4/2013 | Hada | G03B 13/00 |
| | | | 348/240.2 |
| 2013/0120319 A1 | 5/2013 | Givon | |
| 2013/0243250 A1* | 9/2013 | France | G06K 9/46 |
| | | | 382/103 |
| 2015/0161476 A1* | 6/2015 | Kurz | G06K 9/6202 |
| | | | 382/190 |
| 2016/0275353 A1* | 9/2016 | Wnuk | G06F 16/583 |

* cited by examiner

ACCURATE POSITIONING SYSTEM USING ATTRIBUTES

This application is a continuation of application Ser. No. 14/707,638, filed May 8, 2015, now U.S. Pat. No. 10,650,549, which is a continuation of application Ser. No. 13/965,136, filed Aug. 12, 2013, now U.S. Pat. No. 9,036,867, both of which are hereby incorporated by reference herein in their entireties.

BACKGROUND OF THE INVENTION

The cellular network is a communication system that interconnects billions of Mobile Devices to one another and, in turn, to the Internet. The Internet is a communication system that provides connectivity to billions of users with laptops, notebooks, desktops, Internet Enabled TV sets, and mobile devices coupled to the Internet either through the cellular network or via other types of wireless connectivity standards such as cellular, Wi-Fi, Bluetooth, and WiMAX mobile devices. A set of standards for cellular phones includes, for example, 1G, 2G, 3G, 4G LTE, 4G, and 5G which are used by mobile devices to send and receive data, video or voice. The G stands for Generation and LTE stands for Long-Term Evolution. Cellular, Wi-Fi, Bluetooth, and WiMAX standards may be used in cellular phones, smartphones like the iPhone™, Android™, Windows™, and Blackberry™, tablets, and wearable devices.

In recent years, Mobile Devices have been provided with means to determine their position at any given time. The terms position and location are used interchangeably in this document. Once determined, the position of a Mobile Device can be used to enable Location-Based Services, which uses location as the control feature to customize a certain service, and a wide variety of Location-Based Mobile Applications. Examples of Location-Based Mobile Applications include navigation applications, tracking applications, and applications that provide content to the user that is related to the current position of the Mobile Device (e.g., provide a user using a Mobile Application in a certain store with an offer from that store, or provide a user using a Mobile Application in a neighborhood with information on nearby businesses and attractions).

FIG. 1A illustrates that the position of a Mobile Device 1-1 can be determined as an absolute position or a relative position. FIG. 1A shows the Mobile Device Absolute Position 1-2, which is a geographic position expressed in the geographic coordinates Mobile Device Longitude 1-3 and Mobile Device Latitude 1-4. Mobile Device Longitude 1-3 specifies the east-west position and Mobile Device Latitude 1-4 specifies the north-south position of the Mobile Device 1-1 on the Earth's surface. The Mobile Device Longitude 1-3 is expressed as an angle east or west from the Prime Meridian, which is the Meridian that passes through the Royal Observatory, Greenwich. The Mobile Device Latitude 1-4 is expressed as an angle that ranges from 0° at the Equator to 90° North at the North Pole and to 90° South at the South Pole.

A relative position is a position relative to a Reference Point. FIG. 1B illustrates a first method to define a relative position of a Mobile Device 1-1 using a Relative Cartesian Coordinate System 1-5. The Relative Cartesian Coordinate System 1-5 specifies the Mobile Device Relative Position 1-12 in a plane by a pair of numerical coordinates Mobile Device Relative X-Coordinate 1-13 and Mobile Device Relative Y-Coordinate 1-14, which are the signed distances from the Mobile Device 1-1 to two fixed perpendicular reference lines, one called the X Axis 1-10 and one called the Y Axis 1-11. The point where they meet is called the origin. By making the origin coincide with the Reference Point 1-6, and making the X Axis 1-10 parallel to the east-west direction (and therefore the Y axis 1-11 parallel to the north-south direction), the Mobile Device Absolute Position 1-2 can be computed from the Reference Point Absolute Position 1-7, which is defined by the Reference Point Longitude 1-8 and Reference Point Latitude 1-9, using the Mobile Device Relative X-Coordinate 1-13 and the Mobile Device Relative Y-Coordinate 1-14.

FIG. 1C illustrates a second method to define a relative position of a Mobile Device 1-1 using a Relative Polar Coordinate System 1-15. The Relative Polar Coordinate System 1-15 specifies the Mobile Device Relative Position 1-12 in a plane by a pair of coordinates, a first coordinate called Mobile Device Relative Radial Coordinate 1-16, which is the distance from the Mobile Device 1-1 to the Reference Point 1-6, and a second coordinate called Mobile Device Relative Angular Coordinate 1-17, which is the angle of the radius from the Mobile Device 1-1 to the Reference Point 1-6 and the X-Axis 1-10. The Mobile Device Absolute Position 1-2 can be computed from the Reference Point Absolute Position 1-7, which is defined by the Reference Point Longitude 1-8 and Reference Point Latitude 1-9, using the Mobile Device Relative Radial Coordinate 1-16 and Mobile Device Relative Angular Coordinate 1-17.

All the examples above illustrate ways to define the absolute and relative positions in a two-dimensional space, but an expert in the art would know how to extend similar concepts to define the absolute and relative position of a Mobile Device 1-1 in a three-dimensional space, by adding an altitude for the Mobile Device Absolute Position 1-2, a Z Axis and Z-Coordinate for the Relative Cartesian Coordinate System 1-5, and a second Relative Angular Coordinate for the Relative Polar Coordinate System 1-15.

The absolute or relative position of a Mobile Device can be determined using a positioning system. We use the terms positioning system, positioning mechanism, and positioning method interchangeably. Examples of positioning systems include the Global Positioning System (GPS), the Differential GPS, the Assisted GPS, several types of Wi-Fi Based Positioning Systems, and other positioning systems. A positioning system determines the position of a Mobile Device by performing a position computation using a variety of different mechanisms. A positioning system determines the position of a Mobile Device with a certain positioning accuracy, meaning that the position computation contains a certain error, which is introduced by a number of factors that play a role in the computation. The accuracy of a positioning system depends on the mechanisms that the positioning system uses to perform the position computation and on the position itself. Certain positions can be computed with lower or higher accuracy than other positions, depending on a variety of factors. The positioning error means that the actual absolute or relative position of a Mobile Device is only known with a certain uncertainty. This uncertainty can be thought as a region surrounding the actual position of the Mobile Device, and the Mobile Device can be positioned anywhere within that region. Several mechanisms are used to minimize the positioning error. A Location-Based Mobile Application may have certain requirements in terms of the positioning accuracy that is needed for the Location-Based Mobile Application to work properly. For example, a navigational Mobile Application may work properly with an accuracy of several meters, while a tracking Mobile Application that needs to determine which exact product in a supermarket aisle a consumer is facing at a given time may work properly only if the accuracy is about one meter.

FIG. 2A illustrates the Global Positioning System (GPS) 2-1, which consists of a plurality of GPS satellites, comprising GPS Satellite 1 2-2 to GPS Satellite N 2-3. The Global Positioning System (GPS) 2-1 is a space-based satellite navigation system that provides location and time information in all weather conditions to a Mobile Device 1-1 containing a GPS receiver 2-4 anywhere on the Earth where there is an unobstructed line of sight to four or more GPS satellites. As of December 2012, there were 32 GPS satellites in the Global Positioning System 2-1. GPS satellites circle the earth twice a day in a very precise orbit and transmit signal information to earth. The GPS receiver 2-4 uses the messages it receives from the satellites to determine the transit time of each message and computes the distance to each satellite. Then, the computed distances are used to compute the location of the GPS receiver 2-4 using triangulation. The location of the GPS receiver provides the Mobile Device Absolute Position 1-2 in terms of the Mobile Device Longitude 1-3 and Mobile Device Latitude 1-4. About nine satellites are visible from many locations on the ground at any one time. The additional satellites improve the precision of GPS receiver calculation by providing redundant measurements. However, buildings, vegetation, and other obstructions may make one or more satellites not visible from a certain location. When the GPS receiver 2-4 is first turned on, it needs to find orbit and clock data for the relevant satellites. The procedure of acquiring the signal may take time, even of the order of a minute or more, before the location can be computed. This time is called Time to First Fix, and depends on the location, since obstructions and other interferences can make more difficult for the GPS receiver 2-4 to acquire a signal.

The GPS receiver 2-4 computes the Mobile Device Absolute Position 1-2 with a certain accuracy. Several errors may be introduced in the calculation, which affect the precision of the computed location. For example, the GPS receiver 2-4 computes the distance to each GPS satellite in the plurality of GPS Satellites 2-2 to 2-3 by multiplying a signal's travel time by the speed of light. However, the speed of light is not constant as the signal travels through the ionosphere and the troposphere, and thus this calculation introduces an error. Other examples of errors include the multipath errors, the ephemeris errors, the receiver noise error, and errors in the satellite's clock. The GPS receiver 2-4 may include means to correct, at least in part, one or more of these errors. The accuracy of the GPS receiver 2-4 depends on the GPS receiver 2-4 and on the number and position of GPS satellites visible at any given time from a certain position. The accuracy of the GPS calculation depends therefore on the location and time. On average, most GPS receivers have an accuracy of a few tens of meters. The accuracy of the GPS receiver 2-4 rapidly decreases (and eventually the GPS location calculation cannot be performed) if the GPS receiver 2-4 is indoor or if there are any other impediments to its line of sight to the satellites.

A first method to improve the accuracy of the GPS is Differential GPS (DGPS), which is also shown in FIG. 2A. DGPS comprises a network of fixed, ground-based DGPS Reference Stations, comprising DGPS Reference Station 1 2-5 to DGPS Reference Station N 2-6, which broadcast the difference between the positions indicated by the GPS satellites and the known fixed positions of each DGPS Reference Station. The difference correction signal is broadcast to DGPS-capable GPS receivers using ground-based transmitters to improve the accuracy of the computation. A second method to improve the accuracy of GPS is called Wide-Area Augmentation System (WAAS). WAAS is conceptually similar to DGPS. WAAS is a system of 25 ground WAAS Reference Stations positioned across the United States that monitor GPS satellite data and create GPS correction messages which can be received by WAAS-enabled GPS receivers to improve the accuracy of the computation. On average, the accuracy of WAAS-enabled GPS receivers is about 3 meters.

FIG. 2B illustrates a Mobile Device 1-1, such as a cellphone, a smartphone, a tablet, or a wearable device, connected to the Cellular Network 2-7, which is in turn connected to the Internet 2-8. The Mobile Device 1-1 connects to the Cellular Network 2-7 via a plurality of Cell Towers comprising Cell Tower 1 2-9 to Cell Tower N 2-10 via radio signals. Each Cell Tower in the plurality of Cell Towers 2-9 to 2-10 includes a Base Station, which receives and transmits the radio signals to communicate with the Mobile Device 1-1. Most Mobile Devices such as smartphones and tablets include a GPS receiver 2-4 capable of receiving messages from the Global Positioning System 2-1 and compute the Mobile Device Absolute Position 1-2.

Most Mobile Devices such as cellphones, smartphones, tablets, and other devices that are attached to the Cellular Network 2-7 use Assisted Global Positioning System (Assisted GPS) rather than the basic GPS described above to compute the Mobile Device Absolute Position 1-2. Assisted GPS takes advantage of the fact that the Mobile Device 1-1 is attached to the Cellular Network 2-7 to improve the performance of the GPS computation. Each Cell Tower in the plurality of Cell Towers 2-9 to 2-10 comprises a GPS receiver that collects GPS information from the GPS Satellites, at the known location of the Cell Tower. Assisted GPS uses an Assisted GPS Server 2-11, which collects the GPS information collected by the Cell Towers, processes it, and passes it to the Mobile Device 1-1 through radio signals to assist and improve the GPS computation of the Mobile Device Absolute Position 1-2. For example, the Assisted GPS Server 2-11 can compute which are the relevant GPS Satellites that a Mobile Device 1-1 attached to a specific Cell Tower should acquire, can generate correction messages on the GPS information, and can use additional information to help determine the Mobile Device Absolute Position 1-2.

Assisted GPS improves the performance of GPS computation in several ways. Assisted GPS improves the Time to First Fix, since the Assisted GPS Server 2-11 can provide the Mobile Device 1-1 with the list of relevant GPS Satellites that should be acquired. Part of the GPS computation can be performed in the Assisted GPS Server 2-11 rather than in the Mobile Device 1-1, which requires less processing power in the Mobile Device 1-1 and saves battery life. The Assisted GPS Server can also use additional positioning methods to improve the accuracy of the GPS computation in non-optimal locations, such as when the Mobile Device 1-1 is indoors or in a location where the line of sight to the GPS Satellites is obstructed. In certain cases, using the Assisted GPS, the Mobile Device Absolute Position 1-2 may be computed even in locations where there is no line of sight to GPS Satellites, whereby the basic GPS may not be able to compute the location.

A positioning mechanism that the Assisted GPS Server 2-11 uses to improve the accuracy of the computation of the Mobile Device Absolute Position 1-2 when the location may not be optimal for GPS computation is Cell Tower triangulation. In most cases, a Mobile Device 1-1, which is attached to the Cellular Network 2-7 via the plurality of Cell Towers comprising Cell Tower 1 2-9 to Cell Tower N 2-10, actually communicates with more than one Cell Tower at any given time. At a given time, a Mobile Device 1-1 may be attached to a first Cell Tower 1 2-9 and a second Cell Tower N 2-10. Each Cell Tower can compute the Mobile Device Relative Position 1-12, relative to the Cell Tower itself, for example by estimating the distance of the Mobile Device 1-1 from the Cell Tower based on the travel time of the radio signal through the air, and the angle with which the radio signals from the Mobile Device 1-1 are received at the Cell Tower. Typically, the Mobile Device Relative Position 1-12 relative to a first Cell Tower 1 2-9 computed in this way is quite inaccurate. However, if the Mobile Device Relative Position 1-12 of a Mobile Device 1-1 which is attached to more than one Cell Tower is computed relative to more than one Cell Tower, then the computations can be combined by the Assisted GPS Server 2-11 using Cell Tower triangulation and the Mobile Device Absolute Position 1-2 can be computed with better accuracy. This information can in turn be combined with the result of GPS computation to further improve the accuracy of the computed Mobile Device Absolute Position 1-2.

FIG. 2C illustrates a similar positioning mechanism to Cell Tower triangulation that can be used to compute the Mobile Device Absolute Position 1-2 when the Mobile Device 1-1 is attached to the Internet 2-8 via Wi-Fi. This positioning mechanism is called Wi-Fi-Based Positioning, and is prevalently used indoors or in confined areas, such as in a stadium or a shopping mall. One example of Wi-Fi-based Positioning uses a plurality of Wi-Fi Hotspots comprising Wi-Fi Hotspot 1 2-13 to Wi-Fi Hotspot N 2-14. The Wi-Fi Hotspots may be connected to a Local Area Network 2-15, which in turn is connected to the Internet 2-8. The Mobile Device 1-1 includes a Wi-Fi radio that can connect to these Wi-Fi Hotspots. A Wi-Fi Position Server 2-16 computes the distance of the Mobile Device 1-1 to each Wi-Fi Hotspot, and computes the Mobile Device Absolute Position 1-2 or the Mobile Device Relative Position 1-12 using Wi-Fi Hotspot triangulation. The accuracy of the position computation depends on the number of Wi-Fi Hotspots covering a certain location and on the specific computation method used in the Wi-Fi Position Server 2-16.

The Assisted GPS using Cell Tower triangulation and the Wi-Fi-Based Positioning are examples of Hybrid Positioning Systems, illustrated in FIG. 3. A Hybrid Positioning System 3-1 uses more than one positioning mechanism to compute the Mobile Device Absolute Position 1-2. By using more than one positioning mechanism, better accuracy in the computation may be achieved, especially in locations where local conditions may be challenging for a specific positioning system. The Hybrid Positioning System 3-1 may compute a plurality of Position Data comprising a first Position Data 1 3-2 and a second Position Data 2 3-3, the first Position Data 1 3-2 computed using a first position computation mechanism and the second Position Data 2 3-3 computed using a second position computation mechanism. In the Combine 3-6 step, the Hybrid Positioning System 3-1 combines the first Position Data 1 3-2 and the second Position Data 2 3-3, and in the Compute 3-7 step it computes the Mobile Device Absolute Position 1-2. The Hybrid Positioning System 3-1 may use the first Position Data 1 3-2 and the second Position Data 2 3-2 in different ways to compute a more accurate Mobile Device Absolute Position 1-2.

In a first example, the Hybrid Positioning System 3-1 uses the plurality of Position Data as redundant measures, which improves the accuracy of the computed Mobile Device Absolute Position 1-2. For example, the first Position Data 1 3-2 yields a first estimate of the Mobile Device Absolute Position, together with a first Position Accuracy 3-4; the second Position Data 2 3-3 yields a second estimate of the Mobile Device Absolute Position, together with a second Position Accuracy 3-5. By combining the first estimate and the second estimate of the Mobile Device Absolute Position, a Mobile Device Absolute Position 1-2 is computed with better accuracy. In a second example, the Hybrid Positioning System 3-1 uses the second Position Data 2 3-3 to calibrate the first Position Data 1 3-2 and increase the Position Accuracy 1 3-4, which is used to compute the Mobile Device Absolute Position 1-2. For example, the first Position Data 1 3-2 may be a first estimate of the Mobile Device Absolute Position using GPS, with a first Position Accuracy 1 3-4; the second Position Data 2 3-3 may be a GPS correction message computed by an Assisted GPS Server taking advantage of a known location of a Cell Tower. The second Position Data 2 3-3 is used to correct the first Position Data 1 3-2 and compute the Mobile Device Absolute Position 1-2 with increased accuracy. In a third example, the Hybrid Positioning System 3-1 uses the first Position Data 1 3-2 to compute the Mobile Device Absolute Position 1-2 in certain conditions and the second Position Data 2 3-3 to compute the Mobile Device Absolute Position 1-2 in other conditions. For example, the first Position Data 1 3-2 may be an estimate of the Mobile Device Absolute Position using GPS, which is used to compute the Mobile Device Absolute Position 1-2 when the Mobile Device 1-1 is outdoor and without obstructions on the line of sight to the GPS satellites, which are the conditions in which GPS measurements are most accurate. The second Position Data 2 3-3 may be an estimate of the Mobile Device Absolute Position using Cell Tower or Wi-Fi triangulation, which is used to compute the Mobile Device Absolute Position 1-2 when the Mobile Device 1-1 is indoor or in conditions where the GPS measurement is inaccurate or not even possible.

A Mobile Device 1-1 such as a cellphone, a smartphone, a tablet, or a wearable device is illustrated in FIG. 4. The Mobile Device 1-1 consists of Hardware 4-1 and Software 4-2. The Hardware 4-1 comprises at least one Processor 4-3 and at least one Memory 4-4. The Hardware 4-1 also provides the user of the Mobile Device 1-1 with at least one mode of input and one mode of output. A first mode of input may consist of a Keypad 4-4, a first mode of output consist of a Screen 4-5. The Screen 4-5 may be a touch-sensitive screen, which provides a second mode of input. Other modes of input and output, such as voice recognition, may also be provided (not shown). The Hardware 4-1 may also include a Camera 4-6, with which the user can take photos or videos using the Mobile Device 1-1. The Hardware 4-1 also provides Communication Links 4-7. A first communication link in the Communication Links 4-7 is a Cellular Radio 4-11, which includes a transmitter and a receiver, which connects the Mobile Device 1-1 to the Cellular Network 2-12. The Communication Links 4-7 may also include a Wi-Fi Radio 4-10, which includes a transmitter and a receiver, and enables the Mobile Device 1-1 to connect to a Wi-Fi Hotspot. The Communication Links 4-7 may also include a GPS Receiver 2-4 capable of receiving GPS signals from GPS Satellites. If the GPS Receiver 2-4 is present, the Mobile Device 1-1 is capable of computing its position using GPS. The Communication Links 4-7 may also include an Assisted GPS Receiver 4-8, capable of receiving information from an Assisted GPS Server 2-11 connected to the Cellular Network or to the Internet 2-8. If the Assisted GPS Receiver 4-8 is present, the Mobile Device 1-1 is capable of computing its position using Assisted GPS. The Software 4-2 comprises an Operating System 4-12 and a plurality of Mobile Applications comprising Mobile Application 1 4-13, Mobile Application 2 4-14, to Mobile Application N 4-15. Each Mobile Application in the plurality of Mobile Applications may provide specific functionality to the Mobile Device 1-1. One or more Mobile Applications running on the Mobile Device 1-1 may provide ways to compute the Mobile Device Absolute Position 1-2 or the Mobile Device Relative Location 1-12 using different positioning mechanisms, including Hybrid Positioning System. One or more Mobile Applications running on the Mobile Device 1-1 may be Location-Based Mobile Applications and use the computed Mobile Device Absolute Position 1-2 or the Mobile Device Relative Position 1-12 in order to customize their functionality depending on the computed Mobile Device location.

BRIEF SUMMARY OF THE INVENTION

An embodiment of the one of the current inventions uses a plurality of Known Positions that are defined in the area where the accurate position needs to be computed. A first Known Position in the plurality of Known Positions can be defined as an Absolute Position in terms of Latitude and Longitude or as a Relative Position in relation to a Reference Point. When inside a store, a Relative Position is often preferred, since convenient Reference Points are often available, and the distance of any position inside the building from such Reference Points is often easily measurable. A first example of a convenient Reference Point that can be used in a store may be the front door. A second example of a convenient Reference Point that can be used in a store may be a specific corner of the store. A third example of a convenient Reference Point may be the position of a specific cash register. The known position is computed in relation to the position of the shape. The camera may be rather close to the position of the shape, since the camera was able to take an image of the shape. However, an error in position of the portable device can occur with respect to the position of the shape. Where all this makes sense is indoors since GPS may not accurate enough to compute the position of the user when the user is next to a position of a shape while the position computed in relation to the position of the shape provides a more accurate position of the user.

In accordance with another embodiment of the one of the current inventions the Mobile Device includes a Camera that can be used to take an image of the shapes placed with respect to a Reference Point. The Mobile Device also includes a Scanning and Image Recognition Mobile Application, which is capable of controlling the Camera in order to take an image of a shape and includes Image Recognition software capable of recognizing which shape is portrayed in a certain image. For this purpose, the Scanning and Image Recognition Mobile Application compares the shape captured in the image taken by the Camera with shapes in the Shape Database and identifies a specific shape. Then, using the Shape-Position Database, it associates the identified shape with a Known Position in the plurality of Known Positions. It then determines the position of the Mobile Device as the identified Known Position. The Mobile Device also includes an Assisted GPS Receiver, a GPS Receiver, a Wi-Fi Radio, and a Cellular Radio, and may be capable to determine its position using other positioning systems such as Assisted GPS or Wi-Fi-Based Positioning.

In accordance with another embodiment of the one of the current inventions a plurality of Known Positions are defined in the area where the Mobile Device position needs to be determined. The plurality of Known Positions includes a plurality of shapes placed at the polarity of Known Positions. The Shape Database in the Mobile Device is loaded with information describing all the shapes associated with all positions. The Shape-Position Database in the Mobile Device is loaded with information describing the association of each shape with a known position. The Mobile Device captures an image of a shape using the Camera. The Scanning and Image Recognition Mobile Application processes the image and associates it with one of the entries in the Shape Database, defining which shape has been captured by the camera. Then, the known position associated with the recognized shape is determined from the corresponding entry in the Shape-Position Database. The position of the Mobile Device is computed as the determined position.

In accordance with another embodiment of the one of the current inventions includes the operation of the Position Identification Solution, which uses a Mobile Device including a Scanning and Image Recognition Mobile Application running on an Operating System, a Camera, and a Shape Database. The Mobile Device sends data to and receives data from the Wireless Network, which in turn sends data to and receives data from/to the internet. A Positioning Server sends data to and receives data from the Internet. The Mobile Device sends data to and receives data from the Positioning Server. The Positioning Server includes a Shape-Position Database containing a plurality of Shape-Position entries. For each position and each associated shape, there is a corresponding entry in the Shape-Position Database. The Scanning and Image Recognition Mobile Application takes an image of a shape and determines which one of the shapes it possesses. The Mobile Device sends the information of the shape to the Positioning Server. The Positioning Server uses the received information to identify the corresponding entry in the Shape-Position Database and derive an associated position. Then, the Positioning Server determines the position of the Mobile Device as equal to the derived associated position of the captured shape.

In accordance with another embodiment of the one of the current inventions includes using colors instead of shapes and associates a color with each position in the plurality of positions. A plurality of Colors is associated with a plurality of Known Positions wherever the Mobile Device position needs to be determined. The Color Database in the Mobile Device is loaded with information describing all the colors associated with all positions and provides an association of each color with each known position and is loaded in the Color-Position Database in the Mobile Device. The Mobile Device captures an image of a color using the Camera. The software in the Scanning and Image Recognition Mobile Application runs on an Operating System and processes the image and associates it with one of the entries in the Color Database, defining which position has been captured by the camera. The known position associated with the recognized color is determined from the corresponding entry in the Color-Position Database. The position of the Mobile Device is computed as the determined position.

In accordance with another embodiment of the one of the current inventions the combinations of shapes and colors are associated with each known position in the plurality of Known Positions. For example, the Position Identification Solution associates a first shape of a first color with a first known position in the plurality of Known Positions, a first shape of a second color with a second known position in the plurality of Known Positions, a second shape of a first color with a third known position in the plurality of Known Positions, etc. In this embodiment of the one of the current inventions, the Scanning an Image Recognition Mobile Application is capable of recognizing a specific shape of a specific color in the plurality of shape and color combinations that are associated with the known positions in the plurality of Known Position. Once the shape and color combination is recognized, the position of the Mobile Device is determined as equal to the known position associated with the recognized shape and color combination.

In accordance with another embodiment of the one of the current inventions which is used together with other positioning mechanisms as part of a Hybrid Positioning System. The current embodiment of the invention can be used as part of a Hybrid Positioning System in different ways. A first way the current embodiment of the invention can be used as part of a Hybrid Positioning System is by using the current embodiment of the invention to determine a known position and use such a determined position to calibrate a position computed using a second positioning system, such as Assisted GPS or Wi-Fi-Based Positioning from the same position. The Mobile Device includes a Camera and a Scanning Image Recognition Mobile Application running on an Operating System. The Scanning Image Recognition Mobile Application includes software that is capable of recognizing at least one of a shape, a color, or shape-color combination using a Shape Database, a Shape-Position Database, a Color Database, or a Color-Position Database. The Mobile Device also includes a Cellular Radio that sends and receives data to and from the Wireless Network, which is in turn sends and receives data to and from the Internet. The Mobile Device also includes at least one of a GPS Receiver, an Assisted GPS Receiver, and a Wi-Fi Radio. If the Mobile Device includes a GPS Receiver, the Mobile Device receives the data from the GPS and is capable of computing its position using the GPS data, if the Mobile Device includes an Assisted GPS Receiver, the Mobile Device receives the data from the Assisted GPS and is capable of computing its position using the data from the Assisted GPS, and if the Mobile Device includes a Wi-Fi Radio, the Mobile Device receives the data from the Wi-Fi Radio and is capable of computing its position using the data from the Wi-Fi-Based Positioning Systems. The Mobile Device may also include capabilities of computing its position using data received from other positioning systems. A Hybrid Positioning System Server can be attached to the Internet.

An embodiment of the one of the present inventions is a mobile device coupled to a position identification system comprising: an operating system coupled to a camera; a scanning and image recognition unit coupled to the operating system; an attribute database coupled to the scanning and image recognition unit; an attribute-position database coupled to the scanning and image recognition unit; each of a plurality of descriptions in the attribute database describing a corresponding attribute; and each entry in the attribute-position database associating an attribute with a corresponding position, wherein an image obtained by the camera containing a first attribute is coupled to the scanning and image recognition unit which matches the description of the first attribute to one of the plurality of descriptions in the attribute database, wherein the matched description of one of the plurality of descriptions is entered to the attribute-position database to find a position of the first attribute, further comprising: a wireless network coupled to either a hybrid positioning system server or an Internet, wherein the mobile device receives data from and sends data to the wireless network, and the data comprises the description of the attributes, the corresponding positions or both. The mobile device wherein the scanning and image recognition unit comprises a mobile application, wherein another position determined by a second positioning system is enhanced by the position, wherein a device position of the mobile device is defined as equivalent to the position, wherein the attribute database contains descriptions of orientations, objects, shapes, colors, shades, sounds, amplitude, frequencies or any combination therein, wherein the descriptions of the attribute database corresponds to a plurality of descriptions of attributes which is each stored with a known position in a corresponding entry in the attribute-position database.

Another embodiment of the one of the present inventions is a position identification unit apparatus comprising: a mobile device having an operating system coupled to a camera; a scanning and image recognition unit coupled to the operating system, wherein the scanning and image recognition unit receives an image from the camera; an attribute database with a plurality of first descriptions describing each attribute; at least one server with an attribute-position database associating a description of each attribute with a known position; the scanning and image recognition unit extracts a description of an unknown attribute within the image and couples the description to the attribute database matching one of the plurality of first descriptions to provide a description of a known attribute; an internet coupling a cellular network to the at least one server; wherein the description of the known attribute is sent to the server and is matched with the description of one of the attributes in the attribute-position database to provide a known position; wherein the mobile device receives the known position of the attribute from the server. The apparatus wherein a device position of the mobile device defined as equivalent to the known position, further comprising: a second position determined by a second positioning system enhanced by the known position, wherein the descriptions of the attribute database corresponds to a plurality of descriptions of attributes which is each stored with a position in a corresponding entry in the attribute-position database, wherein the attribute database contains descriptions of orientations, objects, shapes, colors, shades, sounds, amplitude, frequencies or any combination therein, wherein the scanning and image recognition unit comprises a mobile application.

Another embodiment of the one of the present inventions is a method of determining a position of an attribute comprising the steps of: taking an image containing an attribute with a camera of a mobile device; receiving data from an attribute database and an attribute-position database in a mobile device; storing the data into the mobile device into a stored attribute database and a corresponding stored attribute-position database, respectively; recognizing a description of the attribute in the image taken by the camera using a scanning and image recognition unit; matching the description of the attribute to a description of a stored attribute in the stored attribute database; and associating the description of the stored attribute in the stored attribute-position database to a position. The process further comprising the steps of: locating a description of another attribute in a different image taken in a different position; matching the description of another attribute to a description of corresponding attribute in the stored attribute database; and associating the description of the corresponding attribute in the stored attribute-position database to another position, further comprising the steps of: coupling a wireless network to either a hybrid positioning system server or an Internet, wherein the mobile device receives data from and sends data to the wireless network. The process wherein a system position determined by a second positioning system is enhanced by either the position or the another position, wherein a device position of the mobile device defined as equivalent to the position, wherein the attribute database contains descriptions of orientations, objects, shapes, colors, shades, sounds, amplitude, frequencies or any combination therein, wherein the descriptions of the attribute database corresponds to a plurality of descriptions of attributes which is each stored with a known position in a corresponding entry in the attribute-position database.

BRIEF DESCRIPTION OF THE DRAWINGS

Please note that the drawings shown in this specification may not necessarily be drawn to scale and the relative dimensions of various elements in the diagrams are depicted schematically. The inventions presented here can be embodied in many different forms and should not be construed as limited to the embodiments set forth herein. Rather, these embodiments are provided so that this disclosure will be thorough and complete, and will fully convey the scope of the invention to those skilled in the art. In other instances, well-known structures and functions have not been shown or described in detail to avoid unnecessarily obscuring the description of the embodiment of any of the inventions. Like numbers refer to like elements in the diagrams.

DETAILED DESCRIPTION OF THE INVENTION

Mobile Devices such as cellular phones, smartphones, and tablets typically include means to determine their position at any given time using different positioning systems, such as GPS, Assisted GPS, Cell Tower triangulation, and Wi-Fi-Based Positioning. The accuracy of each positioning system depends on the position of the Mobile Device at the time a position is computed. For example, the GPS positioning system has poor accuracy when the Mobile Device is indoor or when obstructions prevent a clear line of sight with the GPS Satellites.

The capability of a Mobile Device to determine its position is required in order to enable Location-Based Services and Location-Based Mobile Applications. Location-Based Mobile Applications such as navigation and tracking applications are becoming very popular on Mobile Devices. The user experience of Location-Based Mobile Applications depends on the accuracy of the computed position of the Mobile Device. The accuracy of positioning systems such as Assisted GPS is in general sufficient to be used by Location-Based Mobile Applications such as navigation and tracking applications when the Mobile Device is outdoors and in most locations.

There are Location-Based Mobile Applications which require a very high accuracy of the computed position in order to operate. Furthermore, some of such applications require a very high accuracy of the computed position even when the Mobile Device is indoors. For example, a Location-Based Mobile Application that displays an offer of a certain product to a consumer when that consumer is in front of the shelf in a supermarket where the product is located requires the Location-Based Mobile Application to compute the position of the Mobile Device of that consumer with sufficient accuracy to determine in which aisle in the supermarket the consumer is, and his or her exact position within the aisle. Typically, such a high degree of accuracy may not be achievable by using Assisted GPS, especially in the case where the position needs to be determined indoor, as in the supermarket example.

Figure 1A:
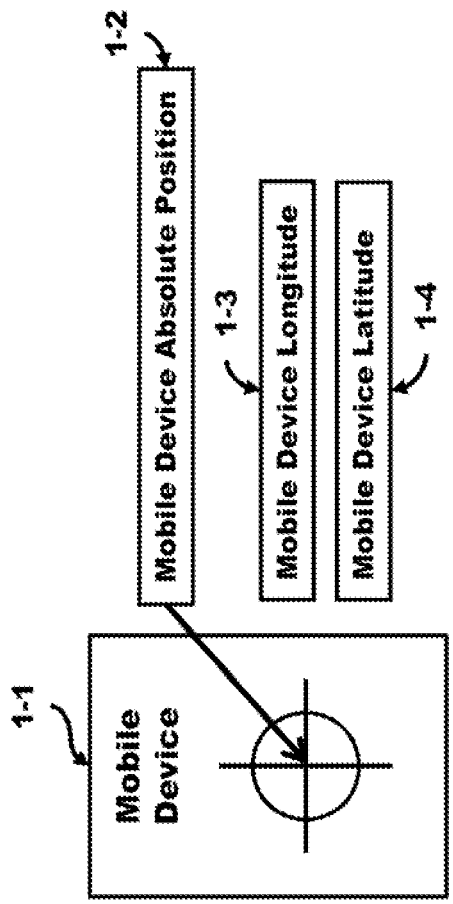
FIG. 1A depicts a Mobile Device and its Mobile Device Absolute Position expressed by a Mobile Device Longitude and a Mobile Device Latitude.
Figure 1B:
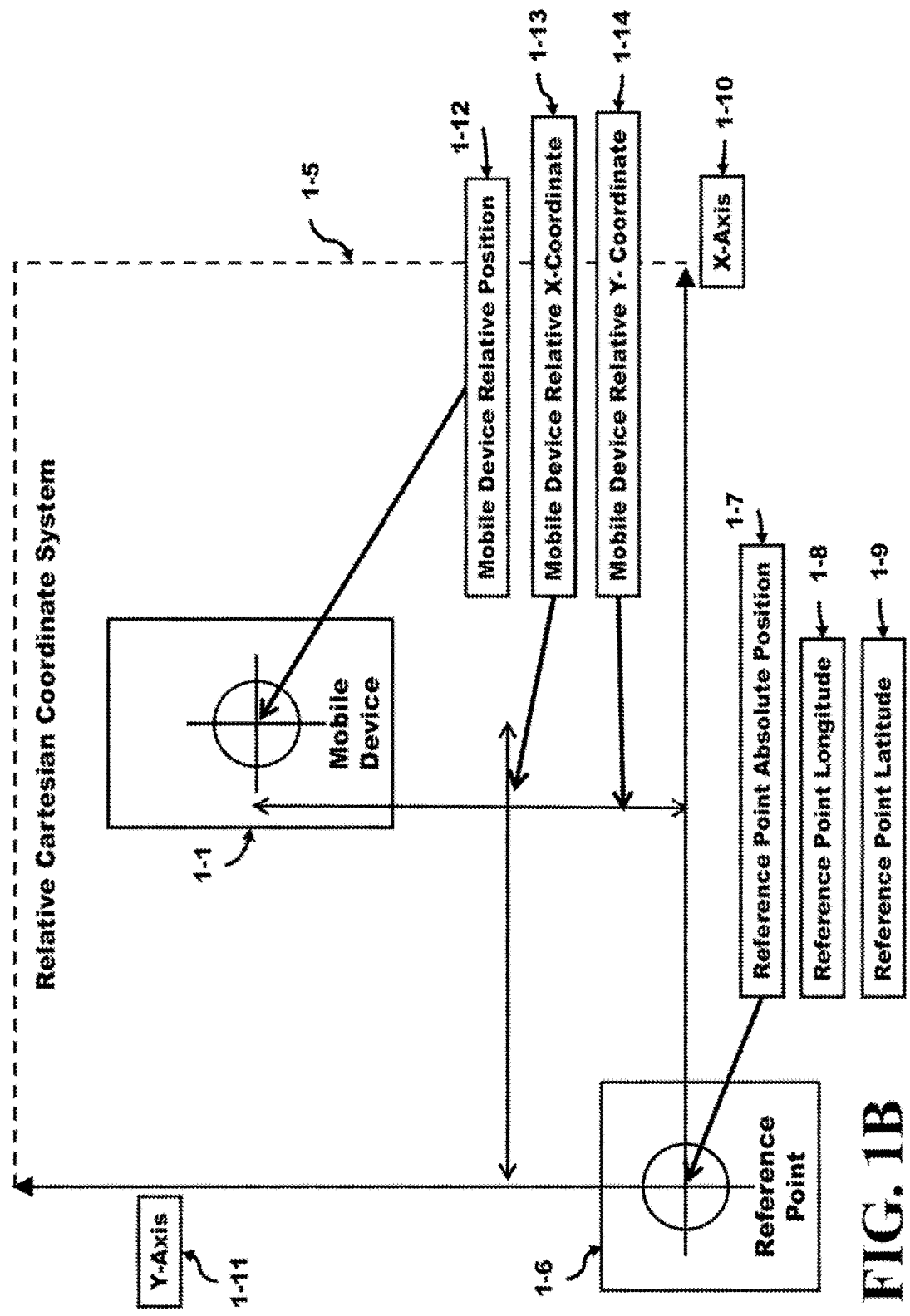
FIG. 1B depicts a Mobile Device and its Mobile Device Relative Position relative to a Reference Point, expressed in a Relative Cartesian Coordinate System.
Figure 1C:
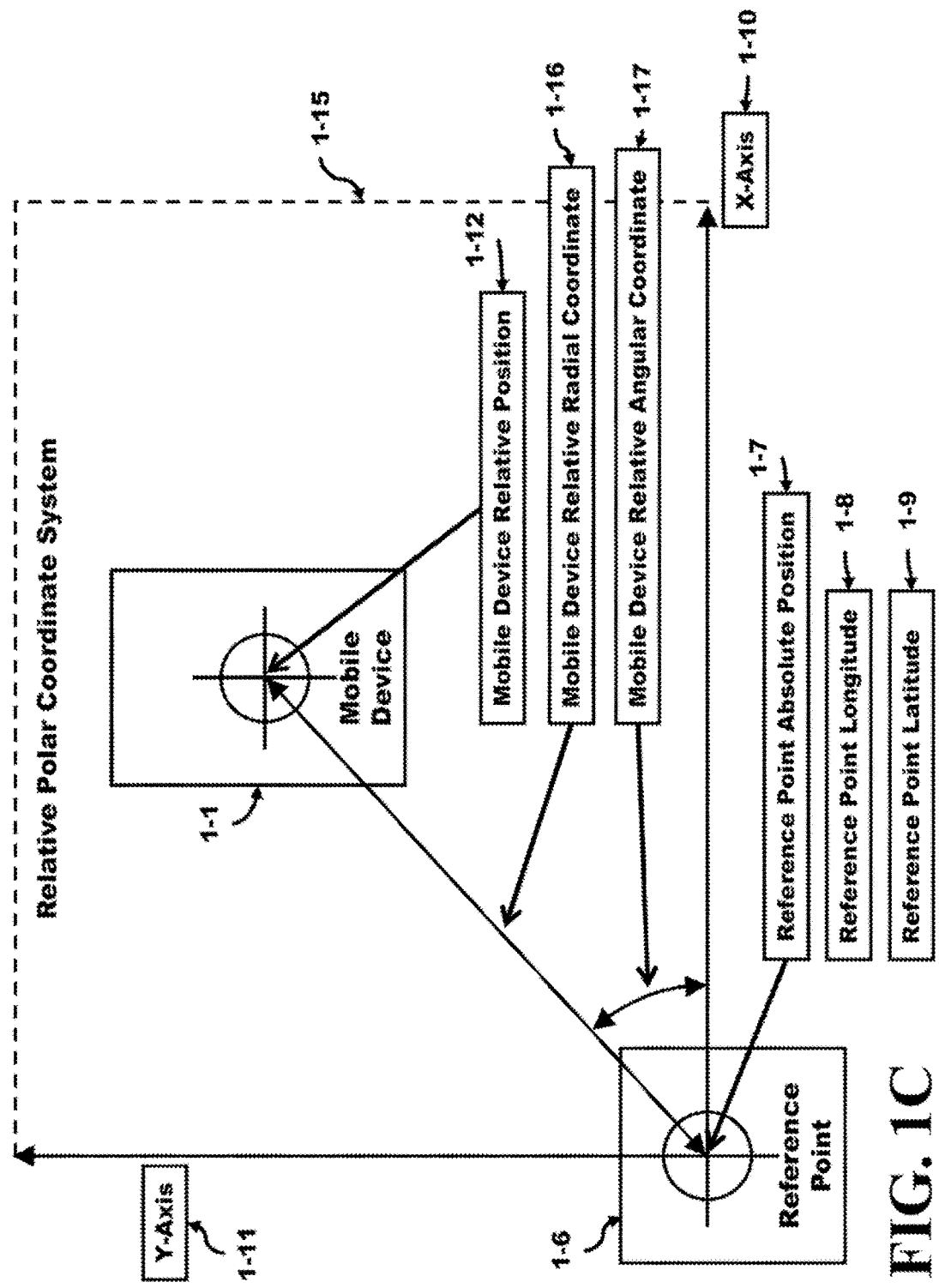
FIG. 1C depicts a Mobile Device and its Mobile Device Relative Position relative to a Reference Point, expressed in a Relative Polar Coordinate System.
Figure 2A:
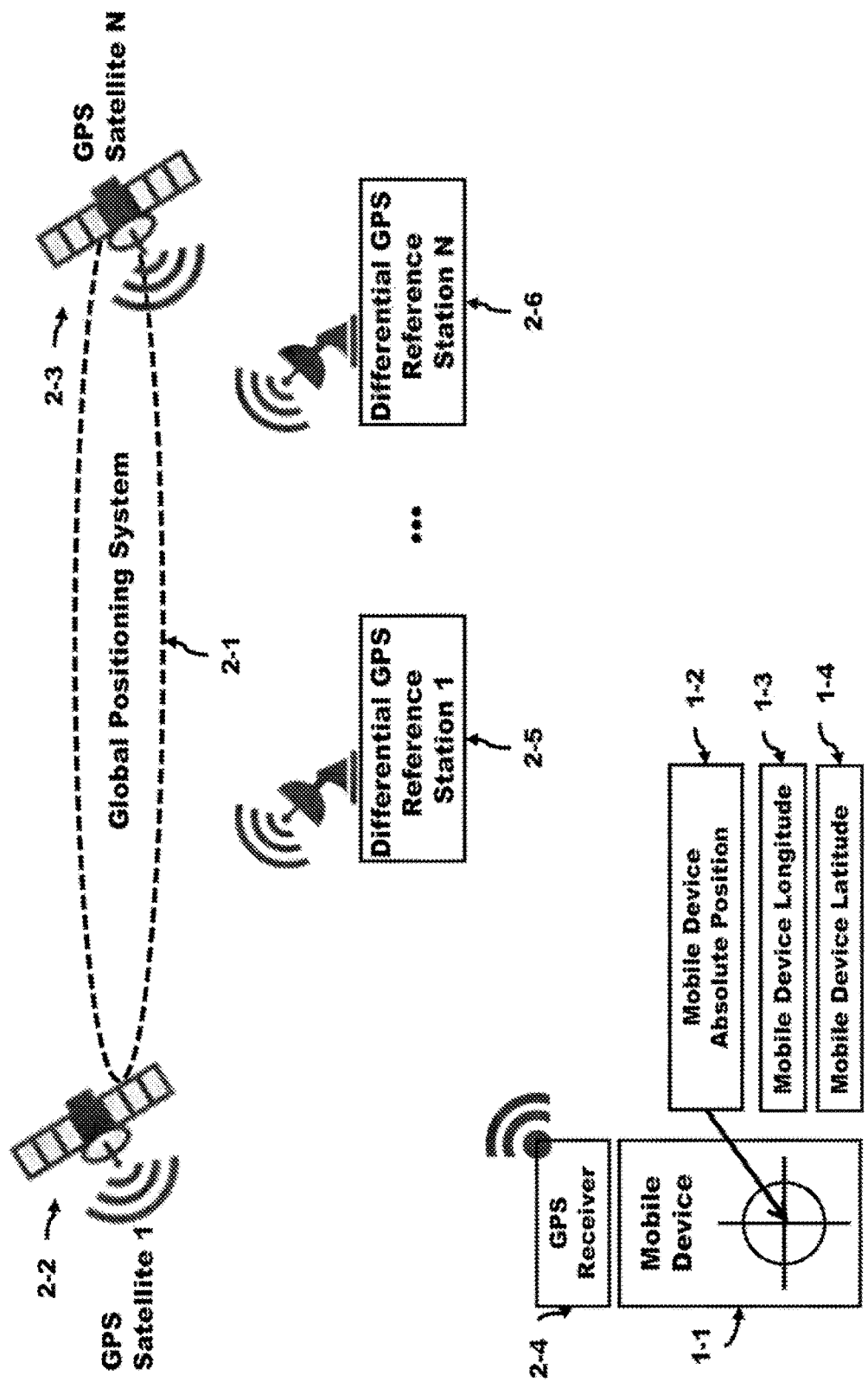
FIG. 2A describes the Global Positioning System (GPS), the Differential GPS, and a Mobile Device with a GPS Receiver capable of computing a Mobile Device Absolute position.
Figure 2B:
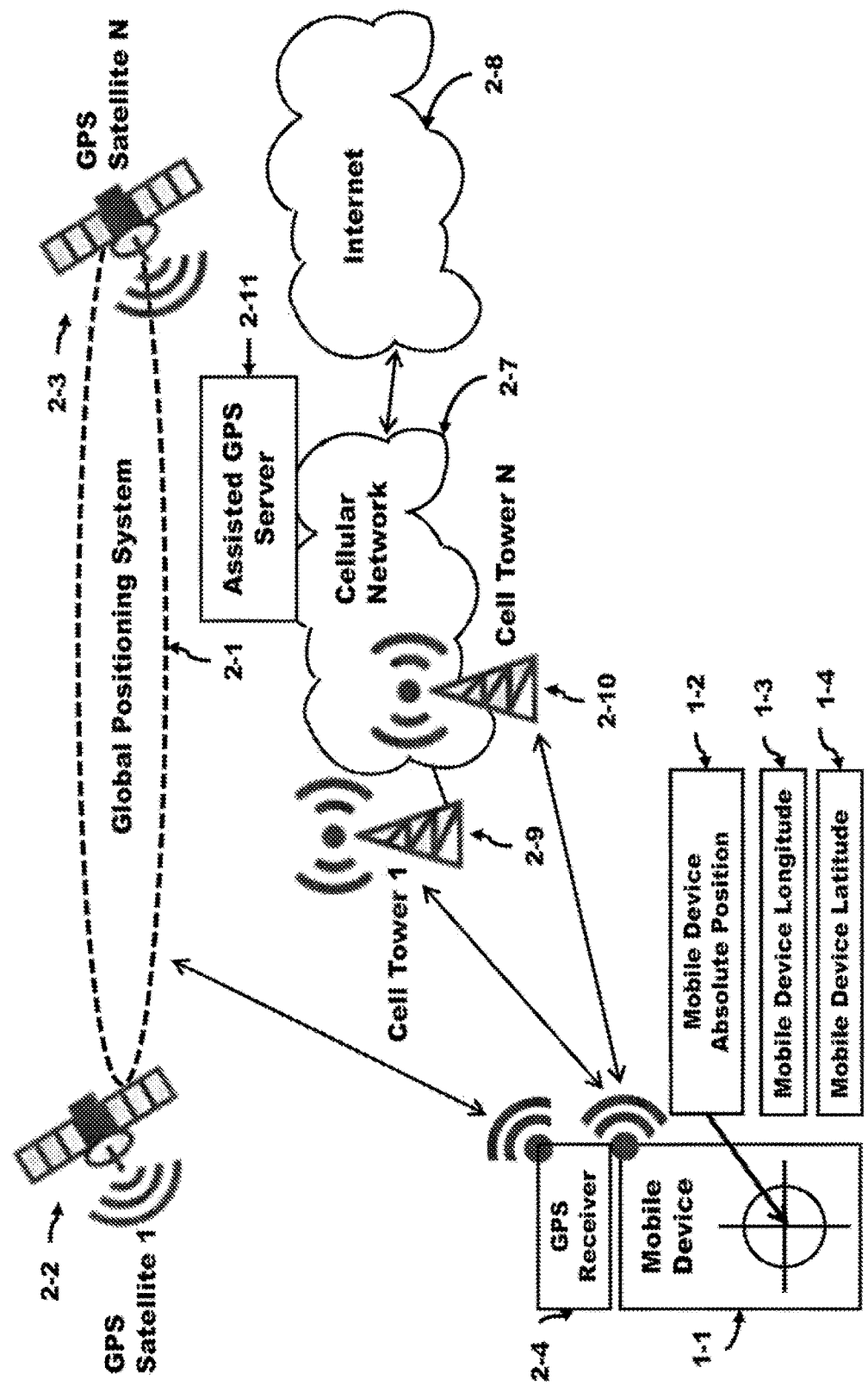
FIG. 2B describes the Assisted GPS and a Mobile Device capable of computing a Mobile Device Absolute position using Assisted GPS and Cell Tower triangulation.
Figure 2C:
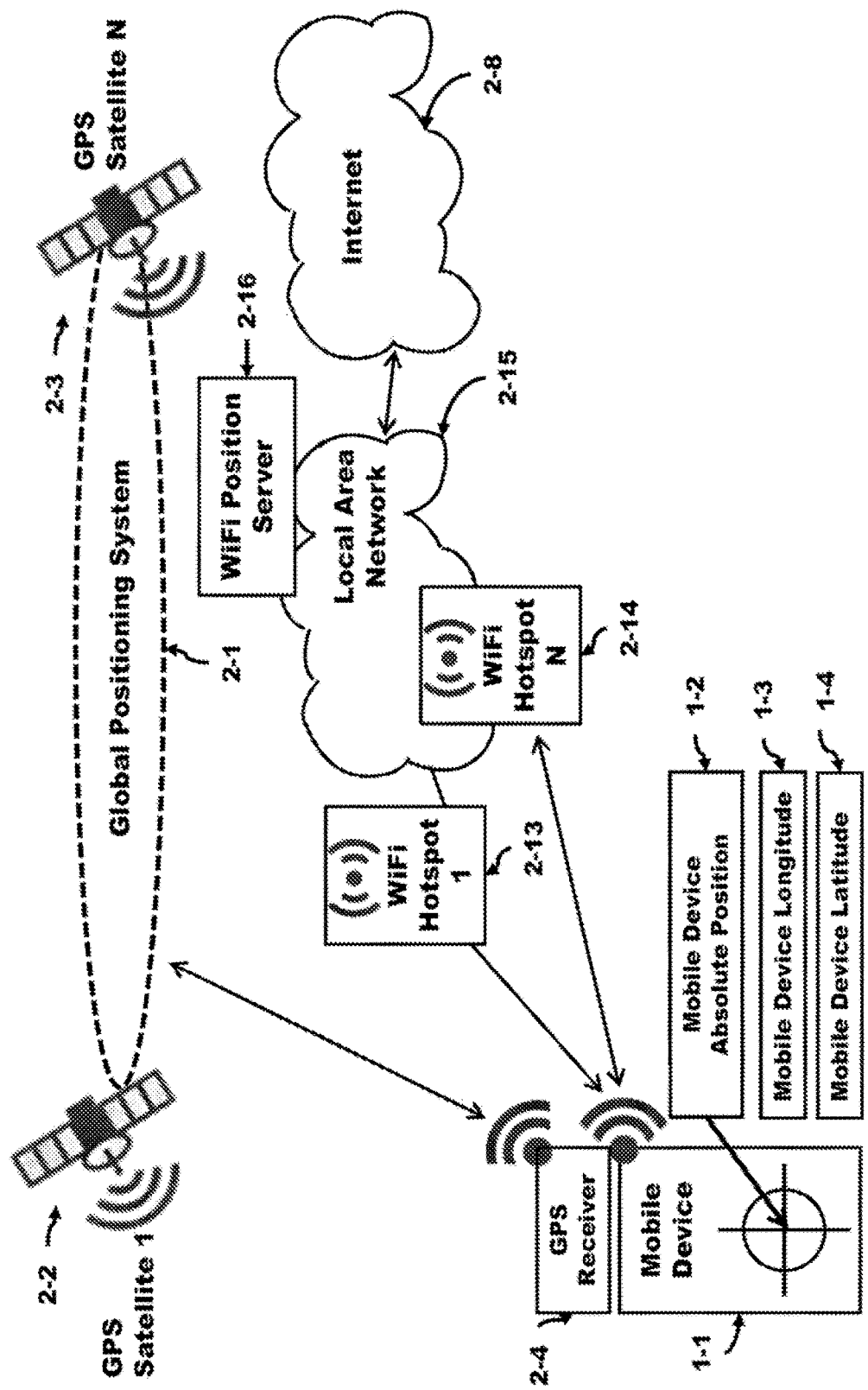
FIG. 2C depicts a Mobile Device and a Wi-Fi-Based Positioning system using Wi-Fi Hotspot triangulation.
Figure 3:
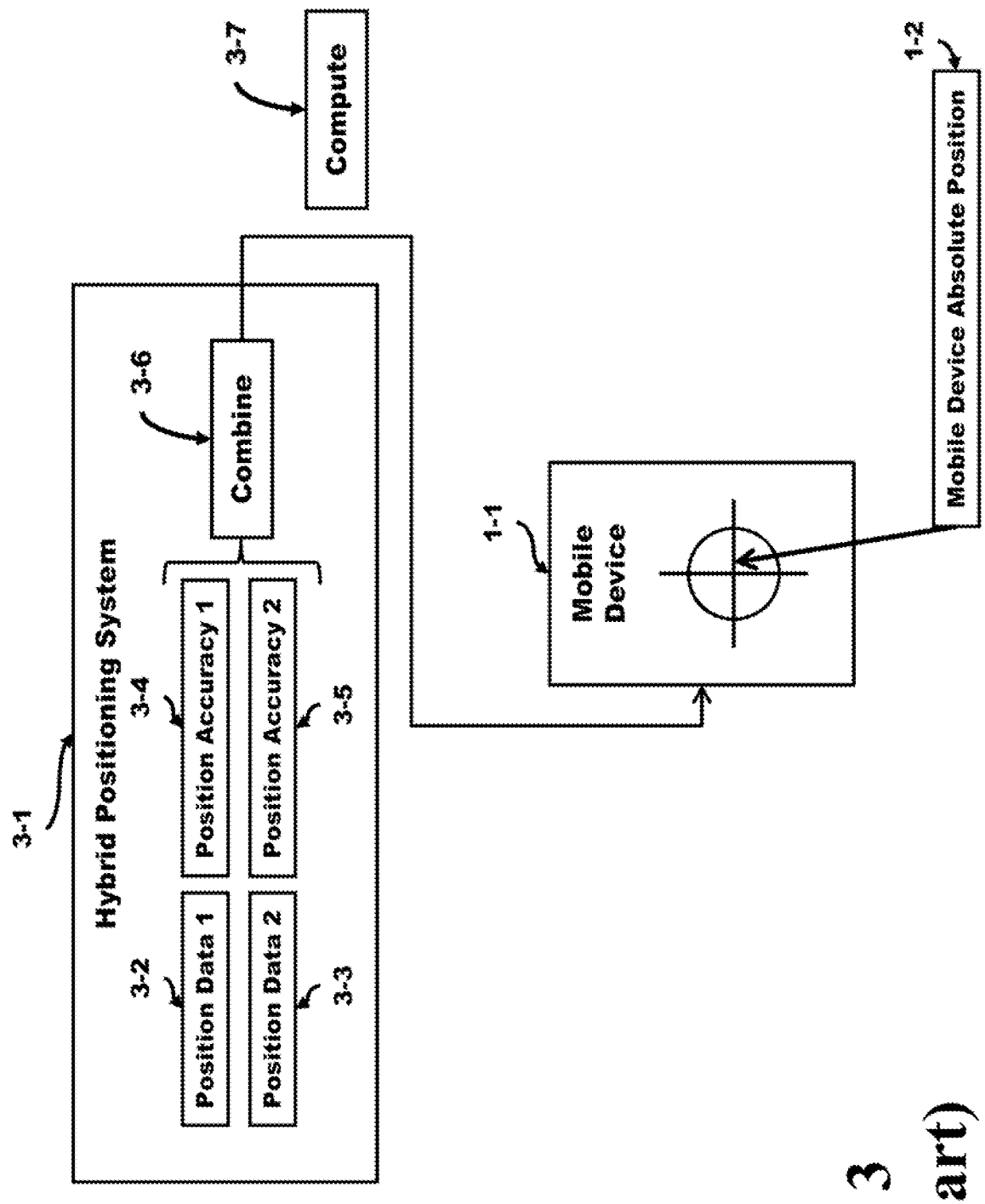
FIG. 3 illustrates the way a Hybrid Positioning System operates in order to compute a Mobile Device Absolute Position.
Figure 4:
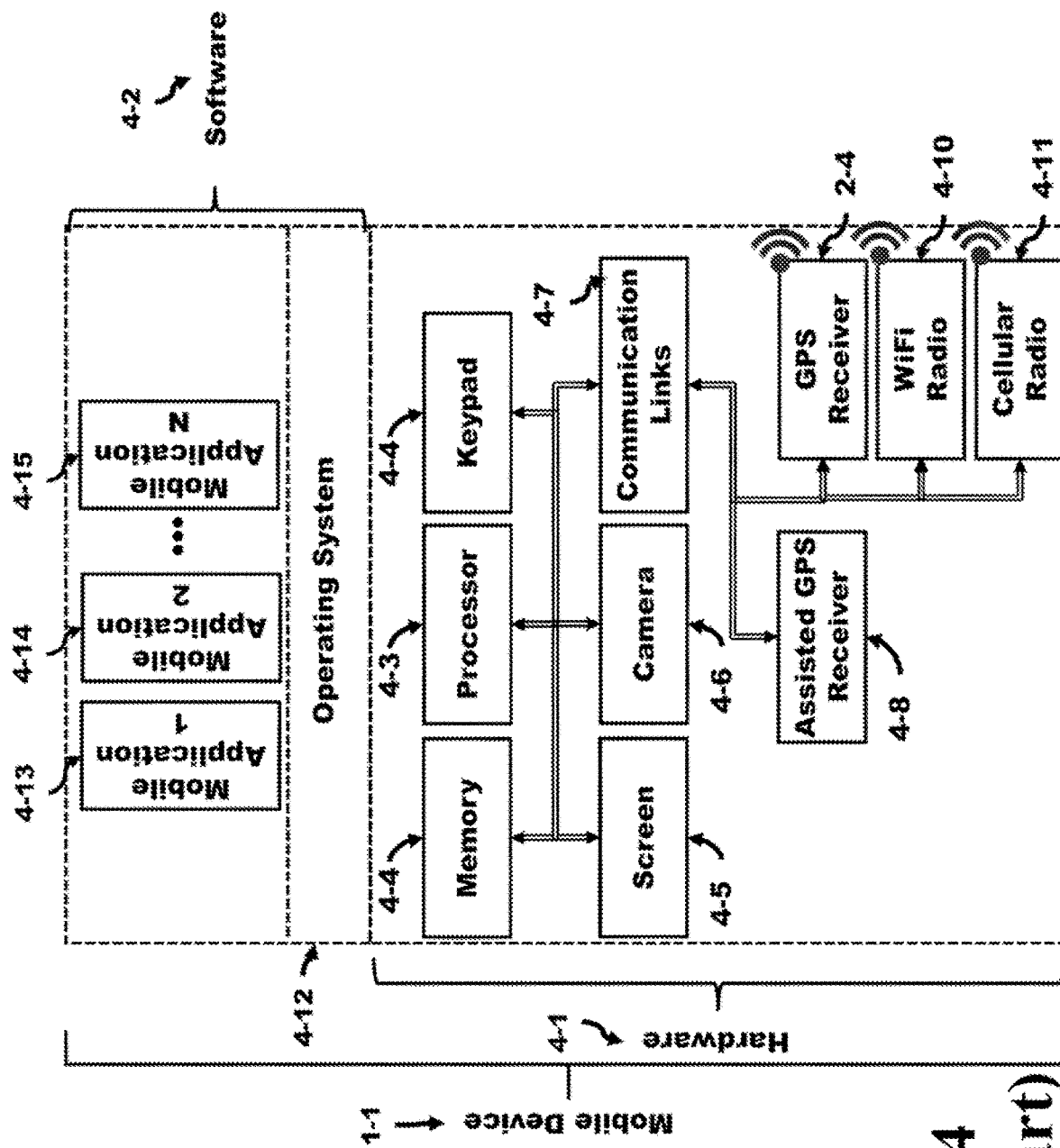
FIG. 4 illustrates a Mobile Device including capabilities to compute its position using different positioning mechanisms.

To enable this kind of Location-Based Mobile Applications requiring very high positioning accuracy, various positioning systems other than Assisted GPS have been designed. They may be used together with Assisted GPS or other positioning systems in Hybrid Positioning Systems. A first example of such a positioning system is the Wi-Fi-Based Positioning System illustrated in FIG. 2C. Certain Wi-Fi-Based Positioning Systems are capable of achieving high accuracy even indoor. However, they require the installation of multiple Wi-Fi Hotspots covering the area, such as a store, where high accuracy is desired, which may be difficult, costly, or even impractical. They also require very accurate calibration in order to operate properly, which may also be difficult and costly. A second example of positioning system capable of high accuracy indoor is a Positioning System using LED lighting and triangulation based on the known position of the LED lighting fixtures. This type of Positioning System requires the installation of special LED lighting and calibration that may also be difficult and costly in a store. It also requires direct line of sight with the Mobile Device, which may be impractical since the user may keep the Mobile Device in his or her pocket while in the store. In general, positioning systems capable of very high accuracy may have drawbacks, such as they may require installation of dedicated equipment, require calibration procedures, or require special handling of the Mobile Device in order to determine its position. Different positioning systems may have different drawbacks, and thus a first positioning system may be adequate to be used in a first location, but may not be in a second location, and a second positioning system may be adequate to be used in a second location but may not be in a third location, and so on.

Thus, there is a need for additional positioning systems that are capable of determining the position of a Mobile Device with high accuracy, even indoor, which is one of the objectives of the present invention.

Another of the objectives of the present invention to provide a Position Identification Solution capable of determining the position of a Mobile Device at a given time with high accuracy. The Position Identification Solution determines the position of the Mobile Device when the Mobile Device is either outdoor or indoor with the same accuracy. The Position Identification Solution may not require the installation of special equipment in the location where the position needs to be determined. The Position Identification Solution may be combined with other positioning mechanisms in a Hybrid Positioning System.

Figure 5:
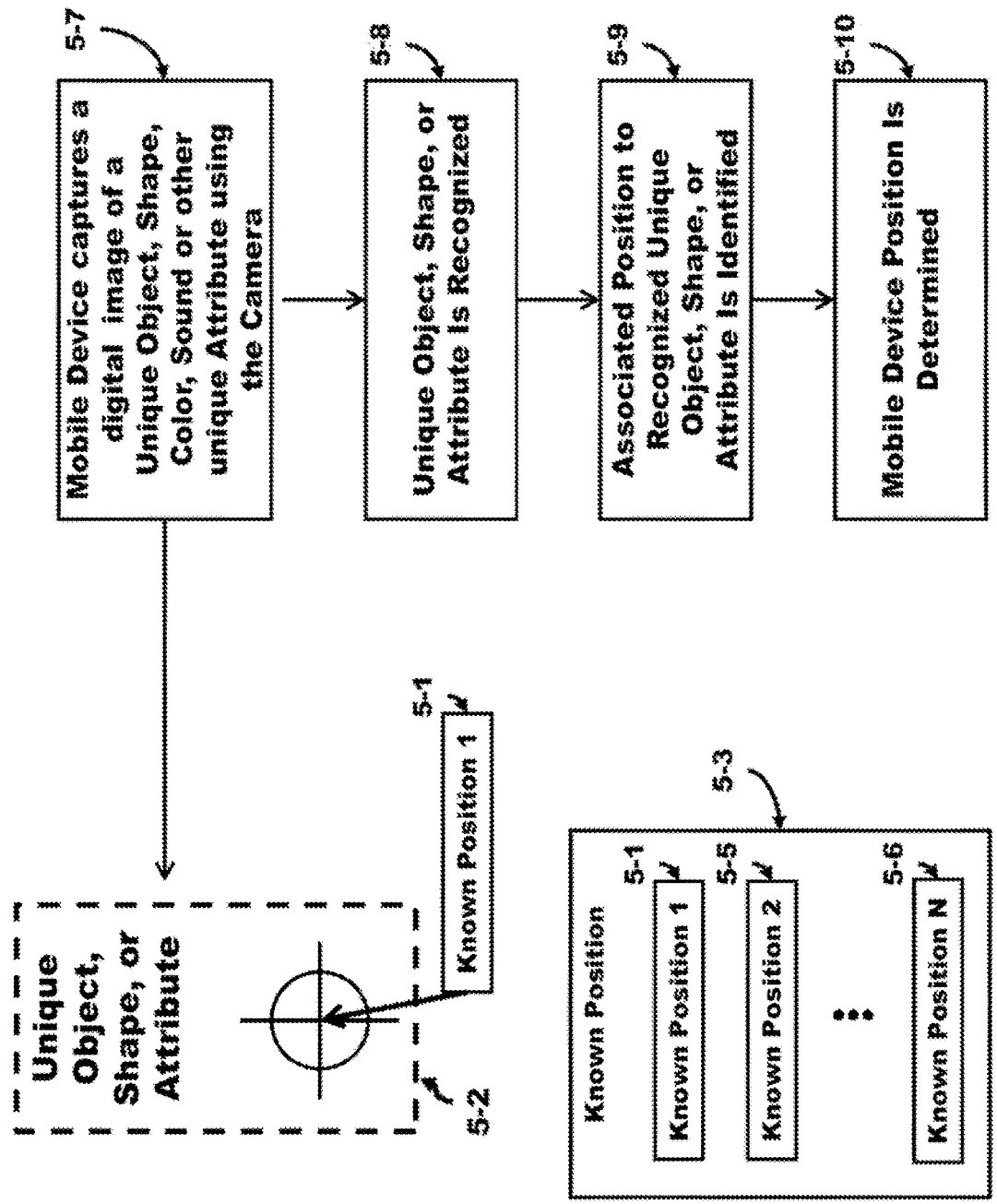
FIG. 5 illustrates an Object, Shape, Color, Sound or other Attribute associated with a Known Position, and how it is used to determine the position of a Mobile Device in accordance with an embodiment of the one of the present inventions.

The operation of one of the current inventions is first shown in FIG. 5. A plurality of Known Positions 5-3 comprising Known Position 1 5-1, Known Position 2 5-5, to Known Position N 5-6, are defined in the area where the accurate position needs to be computed. For example, if the area where the accurate position needs to be computed is a large store, the plurality of Known Positions 5-3 contains Known Positions within the store. A first Known Position 1 5-1 in the plurality of Known Positions 5-3 can be defined as an Absolute Position in terms of a Latitude and a Longitude or as a Relative Position in relation to a Reference Point. When indoor, for example inside a store, a Relative Position is often preferred, since convenient Reference Points are often available, and the distance of any position inside the building from such Reference Points is often easily measurable. A first example of a convenient Reference Point that can be used in a store may be the front door, or more precisely the left/right side of the front door. A second example of a convenient Reference Point that can be used in a store may be a specific corner of the store. A third example of a convenient Reference Point may be the position of a specific cash register.

The position of the camera, which is the position of the mobile device, is computed in relation to the position of the attribute. The camera may be rather close to the position of the attribute, since the camera was able to take an image of the attribute. The device position of the camera in the mobile device is different than the calculated position of the attribute. However, because the difference in these positions are small (the camera needs to be close enough to the attribute to obtain an image) and there is an error in calculating the attribute position equivalent to the distance between the device and attribute, the device position of the mobile device is defined as being equivalent to the known position. By adjusting the characteristics of the camera, this error can be controlled, if so desired. For example, a camera with characteristics that only allow it to focus at close range forces the user to get very close to the attribute in order to take a picture of the attribute. Despite this error, the current invention may provide a more accurate position than other positioning systems. For example, indoors the GPS may not accurate enough to compute the position of the device since the metallic frame of the building surrounding the attributes may not allow the GPS signal to reliability penetrate the building. In this case the GPS position can be enhanced by the calculated position of the attribute. The device which is next to a calculated position of an attribute uses the position of the attribute as the position of the device thereby providing a more accurate position of the user holding the mobile device.

A first Object, Shape, Color, Sound or other Attribute 5-2 is associated with the first Known Position 1 5-1 and placed at the first Known Position 1 5-1 or at a known relation with the first Known Position 1 5-1. An attribute is any characteristic that can distinguish a shape, sound from another. An attribute is anything that can identify objects or shapes, objects or shapes in various orientations, colors in various shades, or sounds having various amplitudes and frequencies; furthermore, each component in the sets of objects, shapes, colors, or sounds are different from each other in each given set. A second Object, Shape, or Attribute, different from the first Object, Shape, Color, Sound or other Attribute 5-2 is associated with the second Known Position 2 5-5. A different Object. Shape, Color, Sound or other Attribute is associated with each Known Position in the plurality of Known Positions 5-3 and placed at the corresponding Known Position in the plurality of Known Positions 5-3 or at a known relation with the corresponding Known Position in the plurality of Known Positions 5-3.

Once all the Objects, Shapes, or Attributes are placed at the corresponding Known Positions or at a known relation with the corresponding Known Positions, the current invention operates as follows in order to determine the position of a Mobile Device 1-1. First, the Mobile Device captures a digital image of an Object, Shape, Color, Sound or other Attribute using the Camera 5-7 in the mobile device. The image is focused by the lens of the camera and projected onto a light sensitive object. The light sensitive object can be fabricated in either of the technologies of Complementary Metal Oxide Semiconductor (CMOS) camera or Charge Coupled Device (CCD). Then, the image is scanned and processed by a scanning and image recognition unit. If a Object, Shape, Color, Sound or other Attribute Is Recognized 5-8, then the Associated Position to Recognized Object, Shape, Color, Sound or other Attribute is Identified 5-9. Finally, the Mobile Device Position Is Determined 5-10 once the Known Position in the plurality of Known Positions 5-3 associated with the recognized Object, Shape, Color, Sound or other Attribute is determined. If the Object, Shape, Color, Sound or other Attribute is placed at a known relation with the associated Known Position, a corresponding adjustment is made to the determined the Mobile Device Position.

One of the current inventions has different embodiments, depending on the type of Object, Shape, Color, Sound or other Attribute that is associated with each Known Position in the plurality of Known Positions 5-3.

Figure 6:
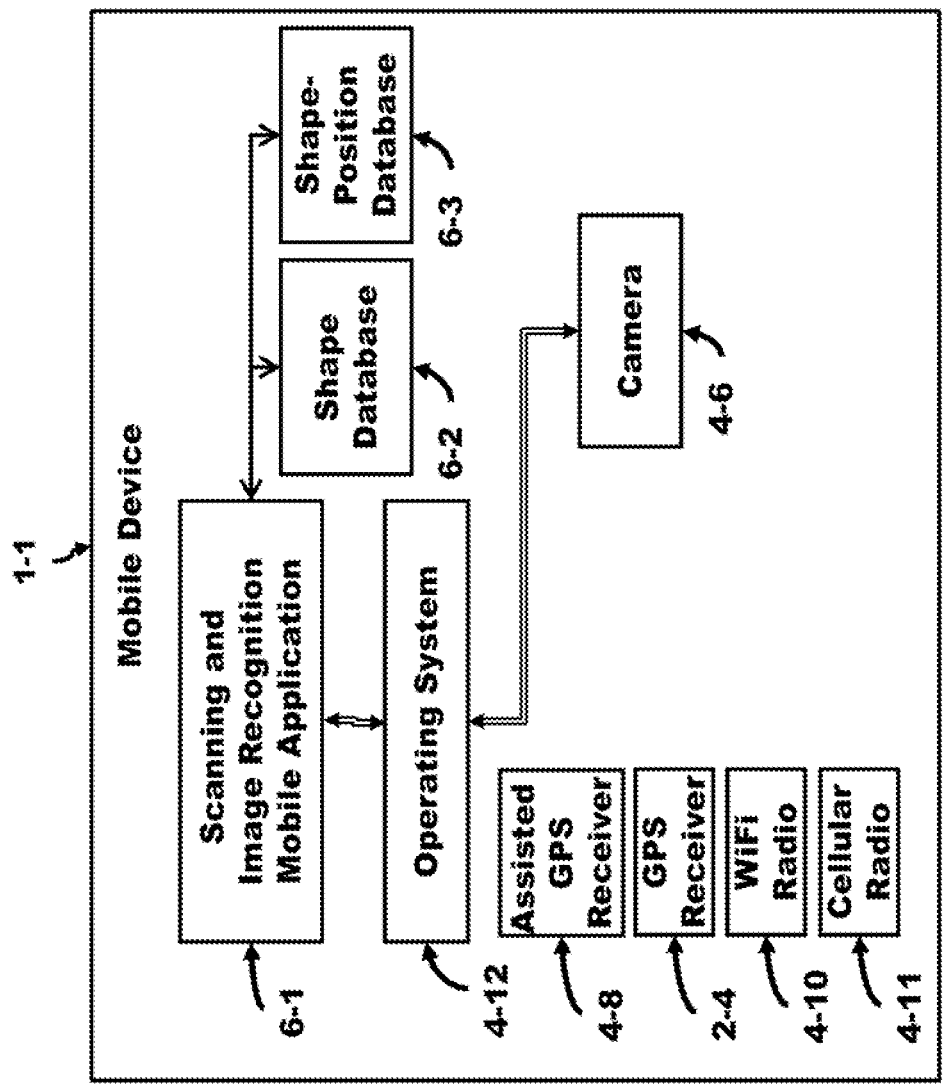
FIG. 6 shows a Mobile Device including a Mobile Application, two Databases, and a Camera in accordance with an embodiment of the one of the present inventions.

A first embodiment of one of the inventions uses shapes associated with each Known Position in the plurality of Known Positions 5-3. A Mobile Device 1-1 capable of determining the position of the Mobile Device 1-1 in accordance with this first embodiment of the current invention is shown in FIG. 6. The Mobile Device 1-1 includes a Camera 4-6 that can be used to take an image of the shapes. The Mobile Device 1-1 also includes a Scanning and Image Recognition Mobile Application 6-1, which is capable of controlling the Camera 4-6 in order to take an image of a shape and includes Image Recognition software capable of recognizing which shape is portrayed in a certain image. For this purpose, the Scanning and Image Recognition Mobile Application 6-1 compares the shape captured in the image taken by the Camera 4-6 with shapes in the Shape Database 6-2 and identifies a specific shape. Then, using the Shape-Position Database 6-3, it associates the identified shape with a Known Position in the plurality of Known Positions 5-3. It then determines the position of the Mobile Device 1-1 as the identified Known Position. The Mobile Device 1-1 also includes an Assisted GPS Receiver 4-8, a GPS Receiver 2-4, a Wi-Fi Radio 4-10, and a Cellular Radio 4-11, and may be capable to determine its position using other positioning systems such as Assisted GPS or Wi-Fi-Based Positioning.

Figure 7:
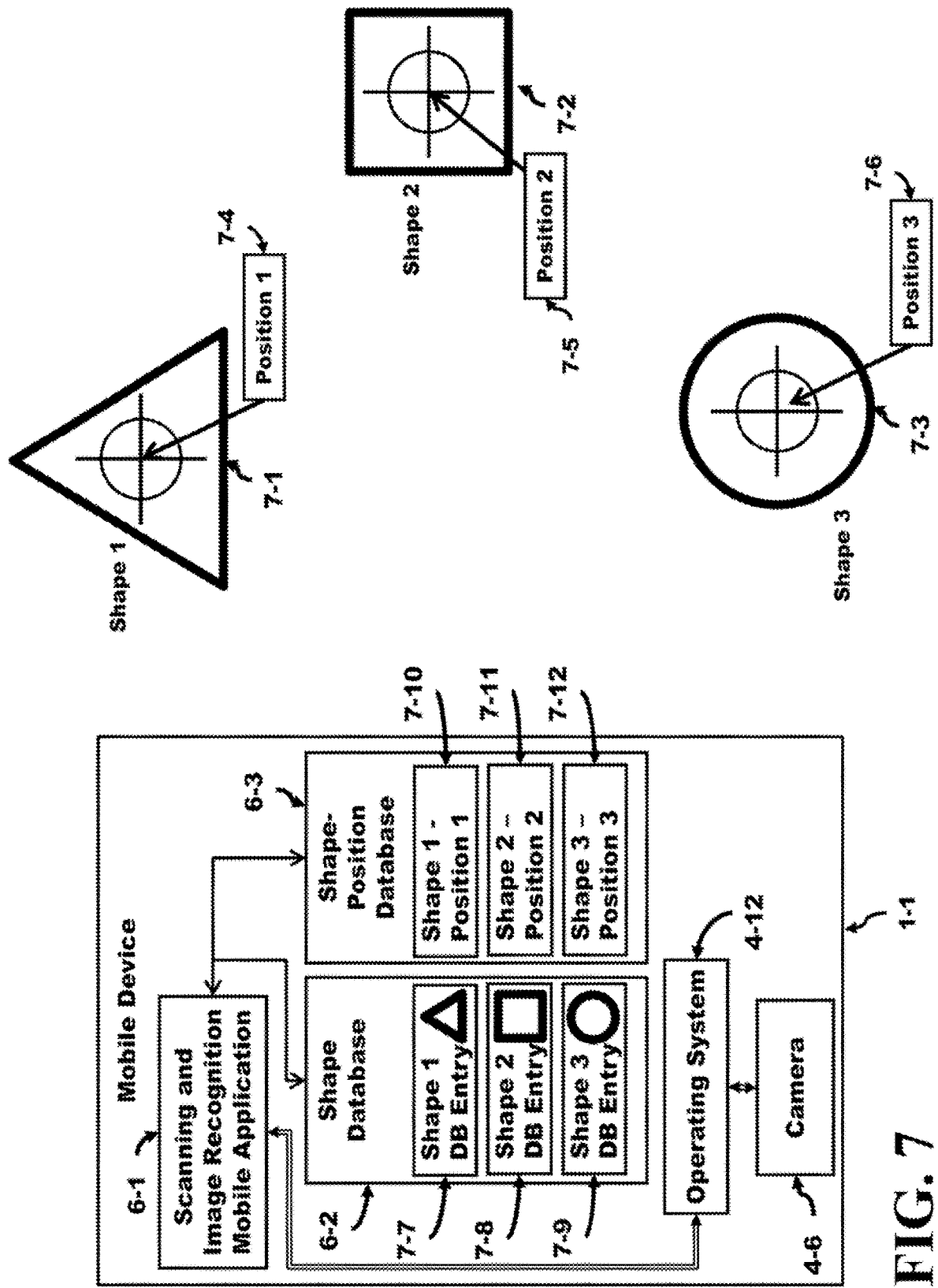
FIG. 7 illustrates the operation of the Position Identification Solution to compute the position of a Mobile Device using shapes in accordance with an embodiment of the one of the present inventions.

FIG. 7 illustrates the operation of the Position Identification Solution in accordance with another embodiment of one of the current inventions. A plurality of Known Positions is defined in the area where the Mobile Device position needs to be determined. The plurality of Known Positions includes a first Position 1 7-4, a second Position 2 7-5, and a third Position 3 7-6. A first Shape 1 7-1 is placed at Position 1 7-4, a second Shape 2 7-2, different from Shape 1 7-1, is placed at Position 2 7-5, and a third Shape 3 7-3, different from both Shape 1 7-1 and Shape 2 7-2, is placed at Position 3 7-6. The Shape Database 6-2 in the Mobile Device 1-1 is loaded with information describing all the shapes associated with all positions. For example, a first Shape 1 DB Entry 7-7 is created in the database describing Shape 1 7-1, a second entry Shape 2 DB Entry 7-8 is created in the database describing Shape 2 7-2, and a third entry Shape 3 DB Entry 7-9 is created in the database describing Shape 3 7-3. The Shape-Position Database 6-3 in the Mobile Device 1-1 is loaded with information describing the association of each given shape with a known position. For example, a first entry Shape 1-Position 1 7-10 describes the fact that Shape 1 7-1 is associated with Position 1 7-4 and is created in the Shape-Position Database 6-3, a second entry Shape 2-Position 2 7-11 describes the fact that Shape 2 7-2 is associated with Position 2 7-5 and is created in the Shape-Position Database 6-3, and a third entry Shape 3-Position 3 7-12 describes the fact that Shape 3 7-3 is associated with Position 3 7-6 and is created in the Shape-Position Database 6-3.

The Mobile Device 1-1 captures an image of a shape using the Camera 4-6. The Scanning and Image Recognition Mobile Application 6-1 processes the image and associates it with one of the entries in the Shape Database 6-2, defining which shape has been captured by the camera 4-6. Then, the known position associated with the recognized shape is determined from the corresponding entry in the Shape-Position Database 6-3. The position of the Mobile Device 1-1 is computed as the determined position. This is further illustrated with an example. The Camera 4-6 takes an image of Shape 2, which in this example is a square shape. The Scanning and Image Recognition Mobile Application 6-1 running on an Operating System 4-12 compares the shape with the shape described in each entry of the Shape Database 6-2 and matches it with Shape 2 using the Shape 2 DB Entry 7-8. Then, the Shape-Position Database 6-3 associates Shape 2 with Position 2 by using the entry Shape 2-Position 2 7-11. Finally, the position of the Mobile Device 1-1 is computed as equal to Position 2.

Figure 8:
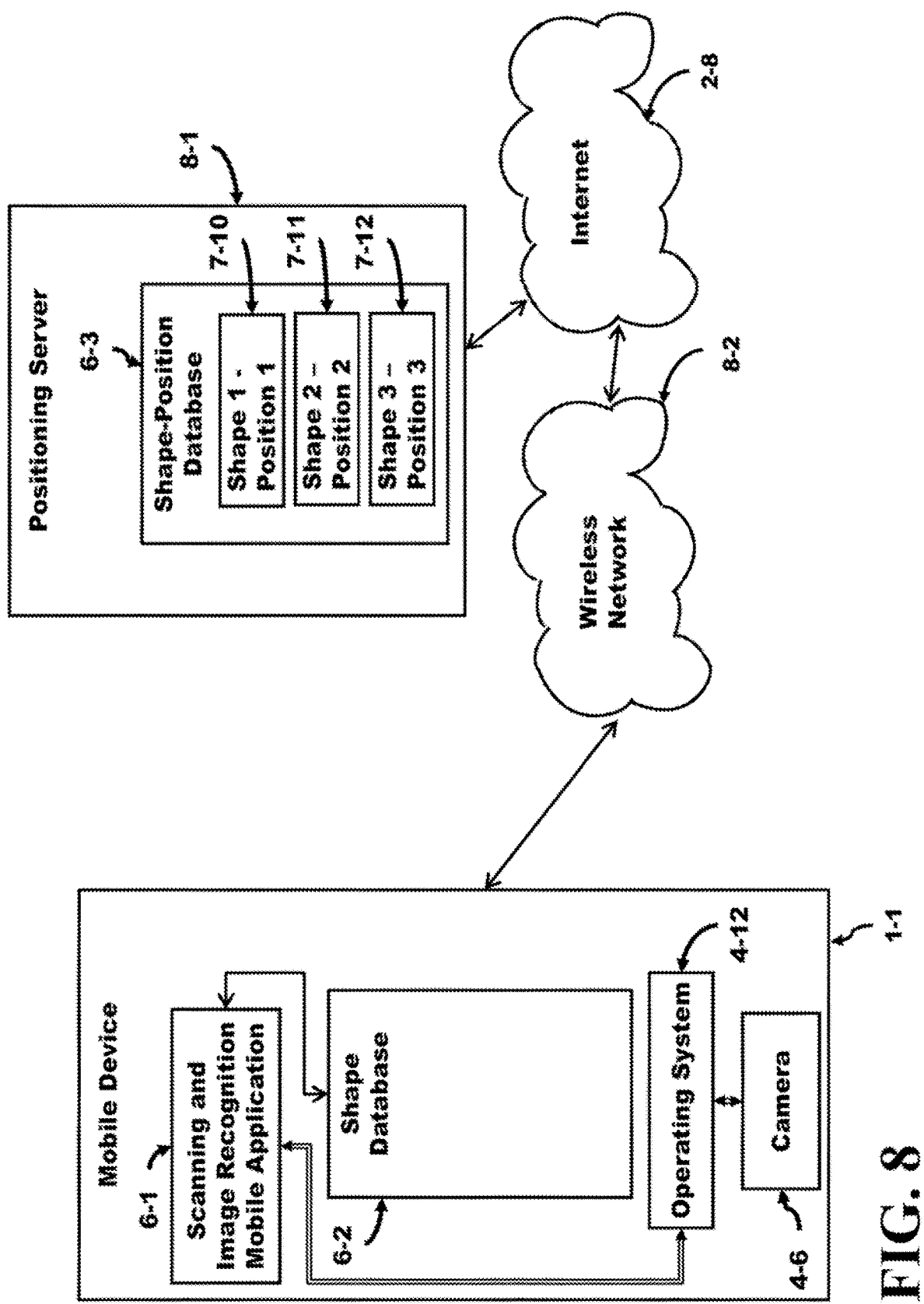
FIG. 8 shows the operation of the Position Identification Solution to compute the position of a Mobile Device using shapes and a Positioning Server in accordance with an embodiment of the one of the present inventions.

FIG. 8 shows the operation of the Position Identification Solution according to a second embodiment of the present invention, which uses a Mobile Device 1-1 including a Scanning and Image Recognition Mobile Application 6-1 running on an Operating System 4-12, a Camera 4-6, and a Shape Database 6-2. The Mobile Device 1-1 is connected to the Wireless Network 8-2, which in turn is connected to the Internet 2-8. The Wireless Network may use standards such as cellular phone systems, Wi-Fi, Bluetooth, and WiMAX Mobile Devices. Some of the components that use these standards may include cellular phones, smartphones like the iPhone™, Android™, Windows™, and Blackberry™, tablets, and wearable devices. A Positioning Server 8-1 is connected to the Internet 2-8. The Mobile Device 1-1 is capable of communicating with the Positioning Server 8-1. The Positioning Server 8-1 includes a Shape-Position Database 6-3 containing a plurality of Shape-Position entries, comprising a first entry Shape 1-Position 1 7-10, a second entry Shape 2-Position 2 7-11, and a Shape 3-Position 3 7-12. For each position and each associated shape, there is a corresponding entry in the Shape-Position Database 6-3. The Scanning and Image Recognition Mobile Application 6-1 takes an image of a shape and determines which shape it possesses. The Mobile Device 1-1 sends the information of the shape to the Positioning Server 8-1. The Positioning Server 8-1 uses the received information to identify the corresponding entry in the Shape-Position Database 6-3 and derive an associated position. Then, the Positioning Server 8-1 determines the position of the Mobile Device 1-1 as equal to the derived associated position of the captured shape.

Figure 9:
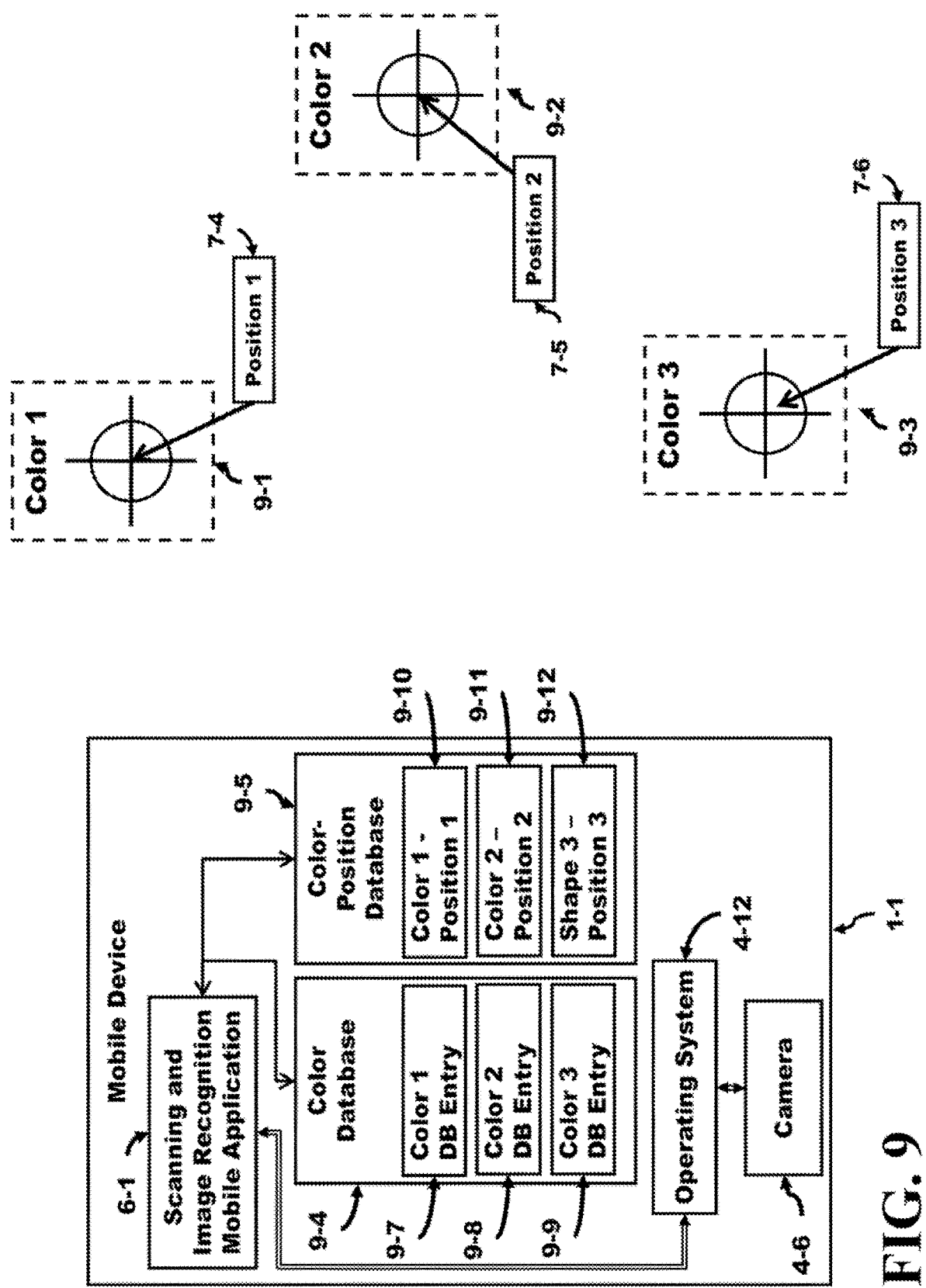
FIG. 9 illustrates the operation of the Position Identification Solution to compute the position of a Mobile Device using colors in accordance with an embodiment of the one of the present inventions.

FIG. 9 illustrates the operation of one of the embodiments of the current invention according to a third embodiment of the current invention. In this case, the Position Identification Solution uses colors instead of shapes and associates a color with each position in the plurality of positions. A plurality of Known Positions is defined in the area where the Mobile Device position needs to be determined. The plurality of Known Positions includes a first Position 1 7-4, a second Position 2 7-5, and a third Position 3 7-6. A first Color 1 9-1 is placed at Position 1 7-4, a second Color 2 9-2, different from Color 1 9-1, is placed at Position 2 7-5, and a third Color 3 9-3, different from both Color 1 9-1 and Color 2 9-2, is placed at Position 3 7-6. The Color Database 9-4 in the Mobile Device 1-1 is loaded with information describing all the colors associated with all positions. For example, a first Color 1 DB Entry 9-7 is created in the database describing Color 1 9-1, a second entry Color 2 DB Entry 9-8 is created in the database describing Shape 2 9-2, and a third entry Shape 3 DB Entry 9-9 is created in the database describing Shape 3 9-3. The Color-Position Database 9-5 in the Mobile Device 1-1 is loaded with information describing the association of each given color with a known position. For example, a first entry Color 1-Position 1 9-10 describes the fact that Color 1 9-1 is associated with Position 1 7-4 and is created in the Color-Position Database 9-5, a second entry Color 2-Position 2 9-11 describes the fact that Color 2 9-2 is associated with Position 2 7-5 and is created in the Color-Position Database 9-5, and a third entry Color 3-Position 3 9-12 describes the fact that Color 3 9-3 is associated with Position 3 7-6 and is created in the Color-Position Database 9-5. The Color-Position Database may be located in a Positioning Server.

The Mobile Device 1-1 captures an image of a color using the Camera 4-6. The Scanning and Image Recognition Mobile Application 6-1 running on an Operating System 4-12 processes the image captured by the camera 4-6 then associates it with one of the entries in the Color Database 9-4, defining which color has been captured by the camera. Then, the known position associated with the recognized color is determined from the corresponding entry in the Color-Position Database 9-5. The position of the Mobile Device 1-1 is computed as the determined position. This is further illustrated with an example. The Camera 4-6 takes an image of Color 2. The Scanning and Image Recognition Mobile Application 6-1 compares the color with the color described in each entry of the Color Database 9-4 and matches it with Color 2 using the Color 2 DB Entry 9-8. Then, the Color-Position Database 9-5 associates Color 2 with Position 2 by using the entry Color 2-Position 2 9-11. Finally, the position of the Mobile Device 1-1 is computed as equal to Position 2.

According to another embodiment of the one of the current inventions, the Position Identification Solution uses combinations of shapes and colors to associate with each known position in the plurality of Known Positions 5-3. For example, the Position Identification Solution associates a first shape of a first color with a first known position in the plurality of Known Positions 5-3, a first shape of a second color with a second known position in the plurality of Known Positions 5-3, a second shape of a first color with a third known position in the plurality of Known Positions 5-3, a second shape of a second color with a fourth known position in the plurality of Known Positions 5-3, and so on. In this embodiment of the invention, the Scanning an Image Recognition Mobile Application is capable of recognizing a specific shape of a specific color in the plurality of shape and color combinations that are associated with the known positions in the plurality of Known Position 5-3. Once the shape and color combination is recognized, the position of the Mobile Device 1-1 is determined as equal to the known position associated with the recognized shape and color combination.

Figure 10:
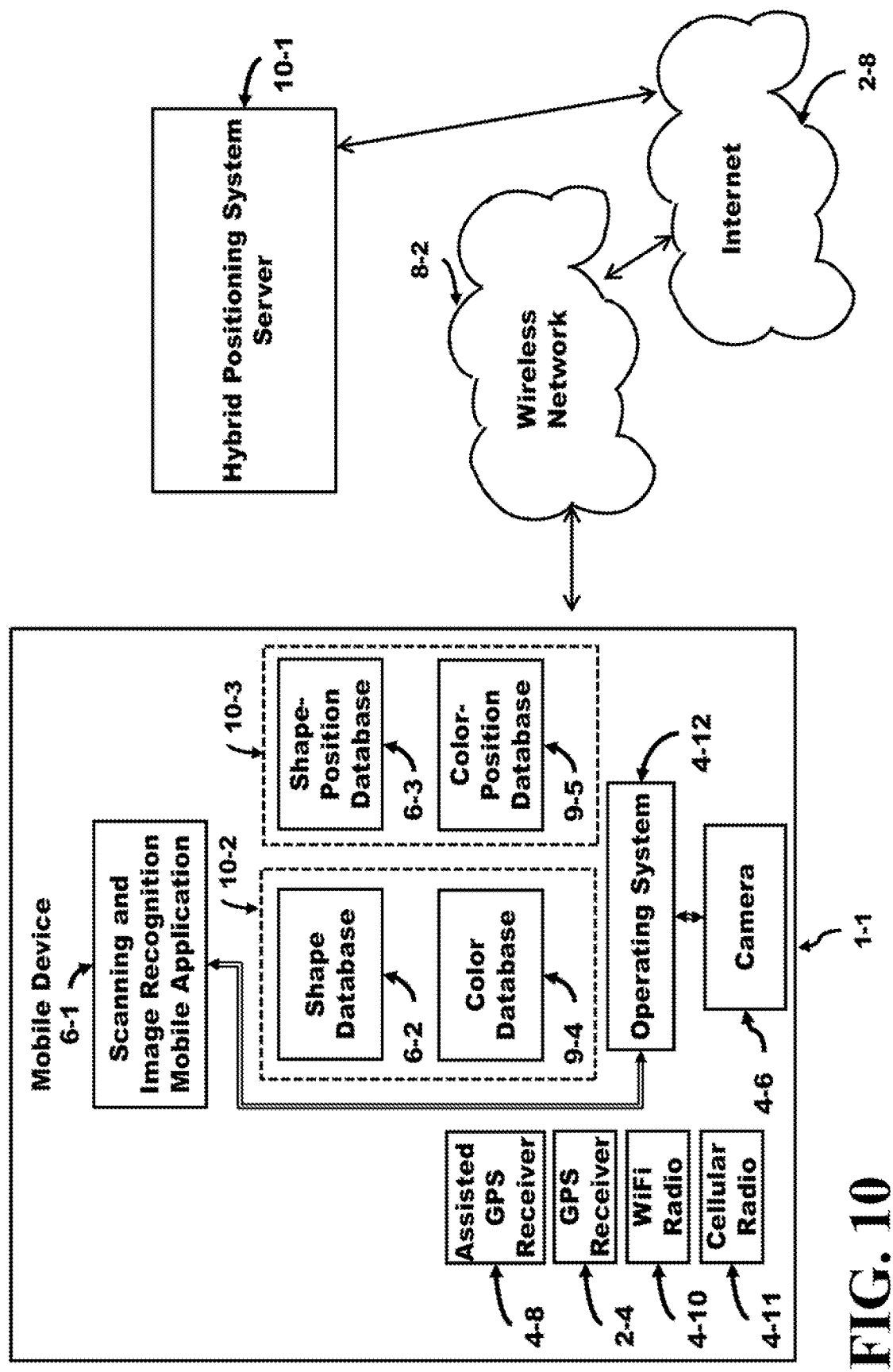
FIG. 10 depicts the Position Identification Solution as part of a Hybrid Positioning System to compute the position of a Mobile Device in accordance with an embodiment of the one of the present inventions.

FIG. 10 illustrates another embodiment of one of the present inventions which is used together with other positioning mechanisms as part of a Hybrid Positioning System. The current embodiment of the invention can be used as part of a Hybrid Positioning System in different ways. A first way the current embodiment of the invention can be used as part of a Hybrid Positioning System is by using the current embodiment of the invention to determine a known position and use such a determined position to calibrate a position computed using a second positioning system, such as Assisted GPS or Wi-Fi-Based Positioning from the same position. The Mobile Device 1-1 includes a Camera 4-6 and a Scanning Image Recognition Mobile Application 6-1 running on an Operating System 4-12. The Scanning Image Recognition Mobile Application 6-1 is capable of recognizing at least one of a shape, a color, or shape-color combination using a Shape Database 6-2, a Shape-Position Database 6-3, a Color Database 9-4, or a Color-Position Database 9-5. The Mobile Device 6-1 also includes a Cellular Radio 4-11 with which it attaches to the Wireless Network 8-2, which is in turn attached to the Internet 2-8. The Mobile Device 6-1 also includes at least one of a GPS Receiver 2-4, an Assisted GPS Receiver 4-8, and a Wi-Fi Radio 4-10. If the Mobile Device 1-1 includes a GPS Receiver 2-4, the Mobile Device 1-1 is capable of computing its position using GPS, if the Mobile Device 1-1 includes an Assisted GPS Receiver 4-8, the Mobile Device 1-1 is capable of computing its position using Assisted GPS, and if the Mobile Device 1-1 includes a Wi-Fi Radio 4-10, the Mobile Device 1-1 is capable of computing its position using Wi-Fi-Based Positioning Systems. The Mobile Device 1-1 may also include capabilities of computing its position using other positioning systems. A Hybrid Positioning System Server 10-1 can be attached to the Internet 2-8.

The Mobile Device 1-1 computes its position using the an embodiment of the invention, thus generating a first Position Data, and also computes its position using a different positioning system, such as GPS, Assisted GPS, or Wi-Fi-Positioning, while in the same position used to generate the first Position Data, thus generating a second Position Data. The Mobile Device 1-1 then sends both the first computed Position Data and the second computed Position Data to the Hybrid Positioning System Server 10-1 through the Cellular Network 2-7 and the Internet 2-8. The Hybrid Positioning System Server uses the first Position Data to calibrate the second Position Data.

A second way the an embodiment of the invention can be used as part of a Hybrid Positioning System is to use the an embodiment of the invention to compute the position of the Mobile Device 1-1 in certain locations and a second positioning system to compute the position of the Mobile Device 1-1 in locations where the an embodiment of the invention may not be used to compute the position of the Mobile Device 1-1. Experts in the field can easily devise additional ways to use the embodiment of the invention in a Hybrid Positioning System, as well as ways to use the an embodiment of the invention together with more than one other positioning system in a Hybrid Positioning System.

The attribute database 10-2 comprises the shape database 6-2 and color database 9-4. The attribute database 10-2 comprises the descriptions of objects, colors, shapes, sounds, etc. The attribute database outputs only one description of a known attribute whenever a description of an unknown attribute is provided as input to the attribute database which is searched therein and generates a match within the database. The objects and shapes can be in various orientations with respect to a horizontal plane. The colors can be in various shades and the sounds can have various amplitudes and frequencies. The attribute-position database 10-3 comprises the shape-position database 6-2 and color-position database 9-5, and a sound-position database (not illustrated). The attribute-position database 10-3 provides the corresponding position once the attribute has been matched and identified.

Finally, it is understood that the above descriptions are only illustrative of the principle of the various embodiments of the invention. Various alterations, improvements, and modifications will occur and are intended to be suggested hereby, and are within the spirit and scope of the various embodiments of the invention. This various embodiments of the invention can, however, be embodied in many different forms and should not be construed as limited to the embodiments set forth herein. Rather, these embodiments are provided so that the disclosure will be thorough and complete, and will fully convey the scope of the various embodiments of the invention to those skilled in the arts. It is understood that the various embodiments of the invention, although different, are not mutually exclusive. In accordance with these principles, those skilled in the art can devise numerous modifications without departing from the spirit and scope of the invention.

What is claimed is:
1. A method comprising:
    storing a plurality of descriptions, a plurality of attributes, and a plurality of positions in a database and an image recognition application in an image capture device, each description in the database describing a respective attribute, and each of the plurality of attributes being associated with a respective one of the plurality of positions;

capturing an image in the image capture device; and matching a description of a first attribute of the image to one of the plurality of descriptions in the database, wherein a matched description is used to determine a position of the first attribute of the image and a location of the image capture device such that the position of the first attribute of the image is used as the location of the image capture device.

2. The method according to claim 1, wherein data including attributes, descriptions, or positions is exchanged on a wireless network.

3. The method according to claim 1, wherein the image capture device includes a mobile application.

4. The method according to claim 1, wherein the image capture device is located indoors or where a line of sight to a global positioning system (GPS) satellite is obstructed.

5. The method according to claim 1, wherein the location of the image capture device is determined without the use of a global positioning system (GPS) satellite.

6. The method according to claim 1, wherein another position determined by a second positioning system is enhanced by the position of the first attribute.

7. The method according to claim 1, wherein the image capture device is a mobile phone and uses a built-in camera to capture the image.

8. The method according to claim 1, wherein the database further includes descriptions of orientations, objects, shapes, colors, shades, sounds, amplitude, frequencies or any combination therein.

9. A mobile device coupled to a position identification system, the mobile device comprising:

at least one processor; and a memory storing one or more programs for execution by the at least one processor, the one or more programs including instructions for:

storing a plurality of descriptions, a plurality of attributes, and a plurality of positions in a database and an image recognition application in an image capture device, each description in the database describing a respective attribute, and each of the plurality of attributes being associated with a respective one of the plurality of positions;

capturing an image in the image capture device; and matching a description of a first attribute of the image to one of the plurality of descriptions in the database, wherein a matched description is used to determine a position of the first attribute of the image and a location of the image capture device such that the position of the first attribute of the image is used as the location of the image capture device.

10. The mobile device according to claim 9, wherein data including attributes, descriptions, or positions is exchanged on a wireless network.

11. The mobile device according to claim 9, wherein the image recognition device includes a mobile application.

12. The mobile device according to claim 9, wherein another position determined by a second positioning system is enhanced by the position of the first attribute.

13. The mobile device according to claim 9, wherein a position of the mobile device is defined as the position of the first attribute.

14. The mobile device according to claim 9, wherein the database further includes descriptions of orientations, objects, shapes, colors, shades, sounds, amplitude, frequencies or any combination therein.

15. A non-transitory computer readable storage medium storing one or more programs configured to be executed by at least one processor, the one or more programs comprising instructions for:

storing a plurality of descriptions, a plurality of attributes, and a plurality of positions in a database and an image recognition application in an image capture device, each description in the database describing a respective attribute, and each of the plurality of attributes being associated with a respective one of the plurality of positions;

capturing an image in the image capture device; and matching a description of a first attribute of the image to one of the plurality of descriptions in the database, wherein a matched description is used to determine a position of the first attribute of the image and a location of the image capture device such that the position of the first attribute of the image is used as the location of the image capture device.

16. The non-transitory computer readable storage medium according to claim 15, wherein data including attributes, descriptions, or positions is exchanged on a wireless network.

17. The non-transitory computer readable storage medium according to claim 15, wherein the image recognition device includes a mobile application.

18. The non-transitory computer readable storage medium according to claim 15, wherein another position determined by a second positioning system is enhanced by the position of the first attribute.

19. The non-transitory computer readable storage medium according to claim 15, wherein a device position is defined as the position of the first attribute.

20. The non-transitory computer readable storage medium according to claim 15, wherein the database further includes descriptions of orientations, objects, shapes, colors, shades, sounds, amplitude, frequencies or any combination therein.

* * * * *